United States Patent
Costa et al.

(10) Patent No.: US 10,059,799 B2
(45) Date of Patent: Aug. 28, 2018

(54) METHOD FOR STABILIZING A CONDENSED PHASE COMPOSITION INCLUDING A CYCLIC ESTER IN A PROCESS OF MANUFACTURING A POLYESTER OR OF LACTIDE

(71) Applicant: Sulzer Chemtech AG, Winterthur (CH)

(72) Inventors: Liborio Ivano Costa, Winterthur (CH);
Hans-Peter Brack, Herrliberg (CH);
Francesca Tancini, Wettingen (CH);
Yingchuan Yu, Zürich (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 15/510,917

(22) PCT Filed: Aug. 19, 2015

(86) PCT No.: PCT/EP2015/069039
§ 371 (c)(1),
(2) Date: Mar. 13, 2017

(87) PCT Pub. No.: WO2016/041722
PCT Pub. Date: Mar. 24, 2016

(65) Prior Publication Data
US 2017/0240700 A1   Aug. 24, 2017

(30) Foreign Application Priority Data

Sep. 17, 2014   (EP) .................................... 14185228
May 8, 2015    (EP) .................................... 15166929
Jun. 22, 2015   (EP) .................................... 15173141

(51) Int. Cl.
C08G 63/02    (2006.01)
C08G 63/85    (2006.01)
C08G 63/08    (2006.01)

(52) U.S. Cl.
CPC ............. *C08G 63/85* (2013.01); *C08G 63/08* (2013.01)

(58) Field of Classification Search
USPC .......................... 528/176, 190, 193, 194, 283
See application file for complete search history.

(56) References Cited

U.S. PATENT DOCUMENTS

| | | | |
|---|---|---|---|
| 5,274,073 A | 12/1993 | Gruber et al. |
| 5,338,882 A | 8/1994 | Korte et al. |
| 5,686,540 A | 11/1997 | Kakizawa |
| 5,770,682 A | 6/1998 | Ohara et al. |
| 5,801,255 A | 9/1998 | Ohara et al. |
| 6,353,086 B1 | 3/2002 | Kolstad et al. |
| 7,942,955 B2 | 5/2011 | Streiff |
| 8,106,150 B2 | 1/2012 | Oka et al. |
| 8,153,754 B2 | 4/2012 | Kamikawa et al. |
| 2009/0111954 A1 | 4/2009 | Matsuo et al. |
| 2017/0240697 A1* | 8/2017 | Costa ................... C08G 63/78 |

FOREIGN PATENT DOCUMENTS

| | | |
|---|---|---|
| CN | 101220138 B | 4/2010 |
| DE | 19631633 A1 | 2/1998 |
| EP | 2532711 A1 | 12/2012 |
| EP | 2698394 A1 | 2/2014 |
| JP | 8-301993 A | 11/1996 |
| JP | 2004175838 A | 6/2004 |
| JP | 2008260893 A | 10/2008 |
| WO | 2010012770 A1 | 2/2010 |
| WO | 2012110117 A1 | 8/2012 |
| WO | 2013184014 A1 | 12/2013 |
| WO | 2014015999 A1 | 1/2014 |
| WO | 2014027037 A1 | 2/2014 |

OTHER PUBLICATIONS

Auras, R. et al. Poly(Lactic Acid), "Synthesis, Structures, Properties, Processing, and Applications", John Wiley & Sons, Inc., 2010, pp. 11-14.

* cited by examiner

*Primary Examiner* — Terressa M Boykin
(74) *Attorney, Agent, or Firm* — Larson & Anderson, LLC

(57) ABSTRACT

A method for stabilizing a condensed phase composition in a process of manufacturing a polyester from cyclic ester monomer comprising the steps of devolatilizing a reaction mixture, which contains i) at least one polymerizable cyclic ester, ii) at least one catalyst and optionally at least one initiator, to produce a vapor stream and a molten residue, wherein the vapor stream includes mainly i) the at least one polymerizable cyclic ester and ii) the at least one catalyst and/or the at least one initiator and/or a reaction product or a residue of the at least one catalyst and/or the at least one initiator and condensing the vapor stream to form the condensed phase composition, wherein at least one polymerization inhibitor is added as stabilizer to the reaction mixture and/or to the condensed phase composition in an amount so that the degree of conversion of the polymerizable cyclic ester in the condensed phase composition is not more than 15%, wherein the degree of conversion is 100■ $(c_0-C_F)/c_0$, wherein $c_0$ is the initial concentration of the cyclic ester in the condensed phase composition obtained by the condensation of the vapor stream and $C_F$ is the concentration of the cyclic ester in the condensed phase composition after addition of 150 ppm of tin octoate as catalyst and of 100 mmol/kg of ethyl-hexanol as initiator to the condensed phase composition and a subsequent heat treatment of condensed phase composition under inert atmosphere conditions for 12 hours at 160° C.

14 Claims, 4 Drawing Sheets

METHOD FOR STABILIZING A CONDENSED PHASE COMPOSITION INCLUDING A CYCLIC ESTER IN A PROCESS OF MANUFACTURING A POLYESTER OR OF LACTIDE

The present invention relates to a method for stabilizing a condensed phase composition, which contains i) at least one polymerizable cyclic ester and ii) at least one catalyst capable of catalyzing the polymerization of the cyclic ester and optionally at least one initiator capable of initiating the polymerization of the cyclic ester in a process of manufacturing a polyester from cyclic ester monomer or in a process of manufacturing lactide from lactic acid. Moreover, the present invention relates to a condensed phase composition obtainable with such a method and to the use of such a condensed phase composition.

Cyclic esters, such as Lactide, glycolide, lactones or the like, are in general very sensitive against hydrolysis, which occurs in the presence of very low amounts of water. The hydroxyl and/or carboxyl groups, which are formed by the hydrolysis reaction, or any other hydroxyl and/or carboxyl group containing substance, which can be present as impurities in the system, can act as polymerization initiators, especially in the presence of even very low amounts of catalyst. Depending upon the type of reaction mechanism, in fact, both alcohols and acids can act as initiators in ring opening reactions, as reported in "Handbook of Ring-Opening Polymerization", Dubois, Coulembier, Raquez, Wiley-VCH, 2009 Weinheim. Furthermore, when an initiator and a catalyst, such as for example an organometallic compound, are both present in the system, the rate of cyclic ester polymerization can even be further enhanced. Examples have been reported by Zhang et al. in Journal of Polymer Science—A, 1994, 32, 2965-2970 and by Kowalski et al. in Macromolecules, 2000, 33, 7359-7370.

The even only partial polymerization of the cyclic esters, such as lactide, glycolide, lactone or the like, in the presence of very low amounts of the aforementioned initiators and/or catalysts leads to an increase in the viscosity of the composition or even to a solidification of the composition.

One example, in which a cyclic ester is used as a starting material, is a process for the polymerization of the cyclic diester of a hydroxyalkanoic acid to the respective polyhydroxyalkanoic acid. Specific examples for such cyclic esters and polymers resulting from a polymerization thereof are lactide—which is the cyclic diester of lactic acid—leading after polymerization to polylactic acid, glycolide—which is the cyclic diester of glycolic acid—leading after polymerization to polyglycolide, ε-caprolactone—which is the cyclic monoester of 6-hydroxyhexanoic acid—leading after polymerization to polycaprolactone. These polymers are of particular interest, because they are made from renewable resources and are biodegradable. Moreover, the technological properties of these polymers come quite close to those of polymers derived from fossil based resources, which is why these polymers are regarded as highly promising substitutes for the latter.

For example, polylactic acid has a wide range of applications. in the biomedical field, namely e.g. in chirurgical implants, in films, such as e.g. in packaging, in fibers, such as e.g. for garments, hygienic articles, carpets and in disposable plastic products, such as e.g. disposable cutlery or containers. Moreover, polylactic acid has found wide application in composite materials, such as in fiber-reinforced plastics.

Generally, two alternative methods for synthesizing polylactic acid are known. The first method is the direct polycondensation of lactic acid to polylactic acid, which leads to low molecular weight polymer only. The second method is the ring-opening polymerization of lactide, which is the preferred method nowadays for the industrial production of polylactic acid. The starting material of the last mentioned method, namely lactide, is commonly produced by fermentation of carbohydrates from biomass, such as starch, sugar or corn resulting in lactic acid, by then oligomerizing the lactic acid and by afterwards subjecting the oligomers to a depolymerization reaction in order to obtain lactide. After purification, the lactide is then polymerized in the presence of a catalyst and optionally an initiator to form high molecular weight polylactic acid. The non-reacted lactide has to be removed after the polymerization to a final concentration of less than at least 0.5% by weight, in order to obtain a product of marketable quality. Such a removal of unreacted lactide can be achieved by means of at least one devolatilization step conducted at elevated temperature and reduced pressure. For example, a two-stage devolatilization process can be performed in order to obtain the required degree of lactide removal and thus to obtain a polymer having the required quality. In order to stop the polymerization reaction, an inhibitor is usually added to the polymeric product at the end of the polymerization and before or after the first devolatilization step. In order to maximize the yield of polymer product per amount of lactide feed, usually the unreacted lactide is recovered after the devolatilization e.g. by condensation, then optionally the condensed product is purified and thereafter the condensed product is recycled into the polymerization reaction.

U.S. Pat. No. 5,770,682 discloses a method for preparing a polylactic acid comprising the steps of i) carrying out a ring-opening polymerization of lactide in the presence of a catalyst for ring-opening polymerization of the lactide to polylactic acid, ii) adding a compound capable of inactivating the catalyst to the resulting reaction mixture and iii) reducing the pressure in a reactor containing the reaction mixture and/or allowing an inert gas to pass through the reactor to remove unchanged lactide from the polylactic acid by devolatilization, wherein the compound capable of inactivating the catalyst is preferably selected from the group consisting phosphoric acid, phosphorous acid, derivatives thereof and aluminum compounds. Two subsequent devolatilization steps are performed and the vapor streams enriched in lactide are recycled to the polymerization reactor. However, in this method unpurified lactide is returned into the polymerization reactor, so that impurities, such as by-products, as well as polymerization catalyst and polymerization initiator which can be devolatilized together with the lactide are also recycled back to the reactor and enrich in the reaction mixture in an uncontrollable way.

WO 2012/110117 A1 describes a similar method for preparing a polylactic acid, which however make use of a purification of the recycled lactide stream by crystallization. More specifically, the method described in WO 2012/110117 A1 comprises the steps of i) performing a ring opening polymerization of lactide using a catalyst and either a catalyst killer compound or an endcapping additive to obtain a raw polylactic acid having a weight average molecular weight (Mw) of at least 10,000 g/mol, ii) purifying the raw polylactic acid by removing and separating low boiling compounds comprising lactide and impurities from the raw polylactic acid by devolatilization of the low boiling compounds as a gas phase stream, iii) purifying the lactide coming from the devolatilization and removing the impurities from the gas phase stream of evaporated low boiling compounds by means of crystallization, wherein the lactide is purified and the removed impurities include a catalyst residue and a compound containing at least one hydroxyl group such that the purified lactide is then polymerized by feeding it back into the ring opening polymerization reactor.

While the polymerization reactor and the devolatilization apparatus operate continuously in these methods, the crystallization unit for purifying the lactide stream usually operates batchwise. This means that the lactide has to be collected after the devolatilization e.g. by condensation, and then stored in tanks in its liquid state (i.e., at elevated temperature) for a certain amount of time, namely usually for several days, before it is fed into the batchwise operated crystallization unit after a sufficient, desired amount of lactide has been collected. However, due to the extended storage time at a relatively high temperature certain problems may arise. Firstly, the hot lactide may partially oligomerize or polymerize, as a consequence of which the viscosity of the condensed composition comprising the lactide increases and lactide to be recycled into the polymerization reactor is consumed. If a certain degree of oligomerization and/or polymerization of the condensed composition occurs, the viscous composition cannot or at least cannot easily be processed in the crystallization unit any more. Secondly, the hot lactide may completely oligomerize or polymerize, as a consequence of which the production run has to be stopped and the condenser tank or other vessel, in which the formerly liquid lactide was stored, has to be tediously emptied or even replaced by fresh equipment, because it is not possible anymore to remove the formed solid polymer during the plant operation. In order to at least reduce the probability that the aforementioned problems occur, the condenser may be equipped with an internal heater, which is able to melt the oligomer and/or polymer possibly being formed therein during the storage. This allows to melt and remove the unwanted highly viscous material form the condenser in the case of undesired oligomerization and/or polymerization. However, this solution is expensive and does not avoid the risk of unwanted oligomerization and/or polymerization of the lactide stream.

Another example is the process for producing the lactide itself by depolymerization of a oligomer and/or polymer of lactic acid. Such a process typically comprises the steps of i) polymerization of lactic acid by polycondensation in a reactor under reduced water partial pressure to form a reaction mixture comprising a polylactic acid prepolymer, ii) adding a catalyst to the reaction mixture and depolymerizing the reaction mixture to lactide, thereafter iii) devolatilizing the reaction mixture to obtain a crude vapor lactide stream and then subjecting the vapor stream to condensation, in order to obtain a condensed phase lactide composition. The so obtained stream may still contain small amounts of substances, such as catalyst and initiator, which can initiate an unwanted oligomerization or polymerization of the lactide, so that—if the respective condensed phase lactide composition is not immediately further processed—, the aforementioned problems occur, namely the oligomerization or even polymerization of the lactide resulting in an increase of viscosity or even to a solidification of the composition.

The object underlying the present invention is to provide a method for reliably stabilizing a condensed phase composition, which contains a polymerizable cyclic ester and a substance initiating and/or catalyzing an oligomerization or polymerization of the cyclic ester, in a process of manufacturing a polyester from cyclic ester monomer or in a process of manufacturing lactide from lactic acid, thus reliably avoiding an unwanted reaction, in particular oligomerization or polymerization, of the cyclic ester and thus an unwanted consumption of the cyclic ester and an unwanted viscosity increase or even solidification of the condensed phase composition, but still allowing to use the stabilized condensed phase composition in its intended application.

In accordance with the present invention, this object is satisfied by providing a method for stabilizing a condensed phase composition, which contains i) at least one polymerizable cyclic ester and ii) at least one catalyst capable of catalyzing a polymerization of the cyclic ester and/or at least one initiator capable of initiating a polymerization of the cyclic ester and/or a reaction product or a residue of the at least one catalyst and/or of the at least one initiator, i) wherein the method is used in a process of manufacturing a polyester from cyclic ester monomer and comprises the steps of:
   a) providing a cyclic ester,
   b) polymerizing the cyclic ester in the presence of the catalyst and optionally the initiator in a reactor to form a reaction mixture comprising polyester and unreacted cyclic ester,
   c) subjecting the reaction mixture to a devolatilization to obtain a purified polyester as molten residue and a vapor, which includes mainly i) the at least one polymerizable cyclic ester and ii) the at least one catalyst and/or the at least one initiator and/or a reaction product or a residue of the at least one catalyst and/or the at least one initiator, and
   d) subjecting the vapor stream to a condensation to obtain the condensed phase composition,
   wherein at least one polymerization inhibitor is added as stabilizer to the reaction mixture and/or to the condensed phase composition in an amount so that the degree of conversion of the polymerizable cyclic ester in the condensed phase composition is not more than 15%, wherein the degree of conversion is 100•$(c_0-c_F)/c_0$, wherein $c_0$ is the initial concentration of the cyclic ester in the condensed phase composition obtained by the condensation of the vapor stream and $c_F$ is the concentration of the cyclic ester in the condensed phase composition after addition of 150 ppm of tin octoate as catalyst and of 100 mmol/kg of ethyl-hexanol as initiator to the condensed phase composition and a subsequent heat treatment of the condensed phase under inert atmosphere conditions for 12 hours at 160° C., wherein
   $i_a$) either at least a part of the polymerization inhibitor is added to the vapor stream drawn off from the devolatilization and/or to the condensed composition, and/or
   $i_b$) at least a part of the polymerization inhibitor is added to the reaction mixture before step c), and wherein the devolatilization is performed at a temperature above 203° C. and at a pressure below 4 mbar or, alternatively, at a temperature above 220° C. and/or at a pressure below 5 mbar, or
ii) wherein the method is used in a process of manufacturing lactide from lactic acid and comprises the steps of:
   a) providing lactic acid,
   b) polycondensation of the lactic acid in a reactor to form a reaction mixture comprising a polylactic acid prepolymer,
   c) adding a catalyst to the reaction mixture and depolymerizing the reaction mixture, d) devolatilizing the reaction mixture to obtain a crude lactide stream,
e) subjecting the vapor stream to a condensation to obtain the condensed phase composition,
wherein at least one polymerization inhibitor is added as stabilizer to the reaction mixture and/or to the condensed phase composition in an amount so that the degree of conversion of the polymerizable cyclic ester in the condensed phase composition is not more than 15%, wherein the degree of conversion is $100 \cdot (c_0-c_F)/c_0$, wherein $c_0$ is the initial concentration of the cyclic ester in the condensed phase composition obtained by the condensation of the vapor stream and $c_F$ is the concentration of the cyclic ester in the condensed phase composition after addition of 150 ppm of tin octoate as catalyst and of 100 mmol/kg of ethyl-hexanol as initiator to the condensed phase composition and a subsequent heat treatment of the condensed phase under inert atmosphere conditions for 12 hours at 160° C., wherein at least a part of the polymerization inhibitor is added to the vapor stream drawn off from the devolatilization and/or to the condensed composition.

The core of the present invention is to add so much of a preferably highly effective inhibitor that an oligomerization or polymerization of the cyclic ester included in the condensed phase composition is completely and reliably avoided, irrespective of how much of compounds capable of initiating and/or catalyzing an oligomerization or polymerization of the cyclic ester are included in the condensed phase, irrespective of the pressure and temperature conditions, at which the condensed phase composition is incubated, and irrespective of the time, for which the condensed phase composition is incubated at these conditions. This solution is somehow illogical, because a compound, namely a polymerization inhibitor, is added as impurity into the cyclic ester composition, which shall be purified from such impurities and, at least for some applications, which shall be returned into a polymerization reactor to polymerize the cyclic ester composition, for which a polymerization inhibitor is of course highly disadvantageous. However, the method in accordance with the present invention reliably stabilizes a condensed phase composition deriving from the devolatilization step and including mainly polymerizable cyclic ester and catalyst and/or initiator for polymerizing the cyclic ester and/or a reaction product or a residue of the at least one catalyst and/or the at least one initiator and thus reliably avoids the risk of oligomerization or polymerization of the cyclic ester composition leading to an unwanted viscosity increase or even to an unwanted solidification of the cyclic ester composition, which makes the composition only hardly or not at all conveyable in industrial plants, and moreover reliably avoids the unwanted consumption of the cyclic ester, however, without preventing the later intended use of the stabilized condensed phase composition, such as for example the polymerization of the stabilized condensed phase composition after a certain time of incubation at an elevated temperature for an extended time. Thus, on the one hand an unwanted consumption of the cyclic ester is avoided and on the other hand the viscosity of the condensed composition comprising cyclic ester is maintained at a low degree so that the condensed composition is freely flowable and can thus be readily conveyed in a production plant from one plant device to another. The polymerization inhibitor may be either added into the condensed phase composition after the devolatilizing step or, in a respective higher amount, which compensates the loss during the devolatilization, before the devolatilizing step, when the devolatilization is performed at a temperature above 203° C. and at a pressure below 4 mbar or, alternatively, at a temperature above 220° C. and/or at a pressure below 5 mbar. The stabilized condensed phase of the cyclic ester composition can then be either purified for example by crystallization, in order to remove all impurities including the added polymerization inhibitor, immediately before its further use, for example in a polymerization reaction, or may be even used in unpurified form. In the latter case, if used in a polymerization reaction, just an excess of catalyst and/or initiator of the polymerization reaction can be added, which compensates the amount of polymerization inhibitor present in the composition. Alternatively, still in the latter case, it can be mixed with a liquid phase composition mainly or partially composed of fresh, still unreacted and inhibitor free cyclic ester.

In accordance with the present invention, a condensed phase composition is a liquid composition obtained after condensation of a gaseous phase.

Moreover, a polymerization product of a cyclic ester is in accordance with the present invention a molecule comprising at least ten molecules formally resulting from the ring opening polymerization of a cyclic ester, covalently connected which each other, whereas an oligomerization product of a cyclic ester is in accordance with the present invention a molecule comprising at least two up to nine molecules formally resulting from the ring opening of a cyclic ester covalently connected which each other.

The present invention is not specifically limited with regard to the melting point of the condensed phase composition, as long as it is below 150° C. Preferably, the melting point of the condensed phase composition is between −50° C. and below 130° C., more preferably −30° C. and 120° C. and even more preferably −10° C. and 110° C. It is a matter of course that the melting point of the condensed phase composition, which essentially consists of the cyclic ester and small amounts of polymerization initiator and/or catalyst, essentially corresponds to that of the cyclic ester. L-Lactide for instance has a melting point of between 95° C. and 97° C., whereas ε-caprolactone has a melting point of −1.5° C. and glycolide has a melting point of between 82° C. and 83° C.

Preferably, the degree of conversion of the polymerizable cyclic ester in the condensed phase composition is not more than 10%, wherein the degree of conversion is—as set out above—$100 \cdot (c_0-c_F)/c_0$, wherein $c_0$ is the initial concentration of the cyclic ester in the condensed phase composition obtained by the condensation of the vapor stream and $c_F$ is the concentration of the cyclic ester in the condensed phase composition after addition of 150 ppm of tin octoate as catalyst and of 100 mmol/kg of ethyl-hexanol as initiator to the condensed phase composition and a subsequent heat treatment of condensed phase composition under inert atmosphere conditions for 12 hours at 160° C. More preferably, the degree of conversion of the polymerizable cyclic ester in the condensed phase composition is not more than 5%, more preferably not more than 2%, yet more preferably not more than 1% and yet more preferably not more than 0.1%.

Moreover, it is preferred that the viscosity of the condensed phase composition at 110° C. is between 0.1 and 500 mPa s, more preferably between 0.5 and 50 mPa s and still more preferably between 1 and 20 mPa s, wherein the viscosity is measured in accordance with the present invention using a suitable viscosimeter or rheometer, which is suitable for measuring the viscosity of liquid substances at high temperature. As an example, the viscosity can be measured with a Rheometer (e.g. Antoon Paar Physica MCR 301) using a coaxial cylinder measuring system (e.g. according to DIN 54453 or according to ISO 3219), under rotational conditions at a shear rate between 1/s and 10/s. Preferably, when measuring hot liquids, the Rheometer is equipped with a pressurized cell (e.g. by nitrogen overpressure) which protects the condensed phase from the environment and prevent evaporation and loss of material during the measurement. In other words, the condensed phase composition is at 110° C. a free-flowable liquid or melt, respectively, with a liquid-like viscosity.

Also with regard to the chemical nature of the cyclic ester, the two embodiments $i_a$) and $i_b$) of the present invention are not particularly limited, as long as it has the required melting point as specified above. In particular, any cyclic monoester, any cyclic diester, any cyclic triester or the like may be used. A particularly suitable cyclic monoester is ε-caprolactone, whereas preferred examples for cyclic diesters are lactide, L-lactide, D-lactide, meso-lactide, glycolide and mixtures thereof. Thus, the at least one cyclic ester is preferably selected from the group consisting of lactide, L-lactide, D-lactide, meso-lactide, ε-caprolactone, glycolide or mixtures of one or more of the aforementioned substances.

As set out above, the condensed phase composition resulting from the devolatilization of the reaction mixture containing i) the at least one polymerizable cyclic ester, ii) the at least one catalyst and optionally the at least one initiator and iii) an oligomerization and/or polymerization product of the cyclic ester and the subsequent condensation of the vapor stream drawn off from the devolatilization is a stream, which includes mainly i) the at least one polymerizable cyclic ester and ii) the at least one catalyst and/or the at least one initiator and/or a reaction product or a residue of the at least one catalyst and/or the at least one initiator. Usually, the condensed phase composition includes at least 80% by weight, more preferably more than 90% by weight and even more preferably more than 95% by weight of polymerizable cyclic ester.

There is no particular limitation of the present patent application concerning the chemical nature of the catalyst included in the reaction mixture and in the condensed phase composition and this depends of course from the kind of pretreatment of the reaction mixture. Preferably, the reaction mixture and the condensed phase composition preferably each contain as catalyst at least one organometallic compound comprising a metal selected from the group consisting of magnesium, titanium, zinc, aluminum, indium, yttrium, tin, lead, antimony, bismuth and any combination of two or more of the aforementioned metals, wherein the at least one organometallic compound preferably comprises as organic residue a residue selected from the group consisting of alkyl groups, aryl groups, halides, oxides, alkanoates, alkoxides and any combination of two or more of the aforementioned groups.

Halides, oxides, alkanoates, alkoxides of the aforementioned metals as well as alkyl- or aryl-group bearing compounds of these metals are particularly preferred catalysts. Even more preferred polymerization catalysts is in this case tin octoate, i.e., tin(II)-2-ethylhexanoate. These catalysts are in particular preferred for the case of alternatives $i_a$) and $i_b$), when the cyclic ester of the condensed phase composition is lactide, and for alternative ii).

Usually, the reaction mixture and optionally the condensed phase composition contain 0.0001 to 1% by weight and preferably 0.001 to 0.05% by weight amount of the catalyst, whereas in the case of organometallic compounds the amount of metal in the reaction mixture as well as in the condensed phase composition is preferably 0.1 to 200 ppm and more preferably 1 to 50 ppm.

Preferably in addition to a polymerization catalyst, the reaction mixture and optionally the condensed phase composition include a polymerization initiator or polymerization co-catalyst, respectively, as well as possible reaction products or residues of the catalyst and initiator. Usually, the reaction mixture as well as the condensed phase composition each contain as initiator at least one compound comprising at least one carboxyl group and/or hydroxyl group, which are very effective to initiate the oligomerization of cyclic esters. Preferably, the reaction mixture and optionally the condensed phase composition include as polymerization initiator at least one compound selected from the group consisting of water, alcohols, lactic acid, oligomers of the cyclic ester, polymers of the cyclic ester and any combination of two or more of the aforementioned substances. Preferably, the oligomer and/or polymer of the cyclic ester is an oligomer and/or polymer of lactic acid or glycolide.

While a catalyst is defined within the scope of the present invention in line with the usual definition of this term in the relevant field as a substance increasing the rate of a chemical reaction without being consumed by the reaction, a polymerization initiator or polymerization co-catalyst or promoter, respectively, is defined—also in line with the usual definition of this term in the relevant field—as a substance that improves the catalytic activity.

Usually, the reaction mixture contains an amount of initiator corresponding to 0.1 to 100 mmol and more preferably 1 to 40 mmol per kg of raw material.

The devolatilization of the reaction mixture including i) the at least one polymerizable cyclic ester, ii) the at least one catalyst and optionally the at least one initiator and/or a reaction product or a residue of the at least one catalyst and optionally of the at least one initiator and iii) an oligomerization and/or polymerization product of the cyclic ester, to produce the vapor stream may be performed in any known devolatilization reactor at elevated temperature and under reduced pressure. In the alternatives $i_a$) and ii) of the method in accordance with the present invention, preferably, the devolatilization is performed at a temperature between 170° C. and 250° C. and at a pressure between 0.1 and 50 mbar, more preferably at a temperature between 180° C. and 240° C. and at a pressure between 0.5 and 25 mbar and most preferably at a temperature between 190° C. and 230° C. and at a pressure between 1 and 10 mbar. While the devolatilization can be done under vacuum, alternatively an inert gas, such as nitrogen, argon or carbon dioxide, may be purged through the devolatilization device. The aforementioned devolatilization conditions are in particular useful for devolatilizing a reaction mixture including lactide as cyclic ester, but are also useful for example for devolatilizing a reaction mixture including glycolide or ε-caprolactone as cyclic ester. In the alternative $i_b$) of the method in accordance with the present invention, the devolatilization is performed at a temperature of above 203° C. and at a pressure of below 4 mbar or, alternatively, at a temperature of above 220° C. and/or at a pressure of below 5 mbar. Preferably, the devolatilization is performed in the alternative $i_b$) at a temperature of 205 to 220° C. and at a pressure of below 4 mbar and more preferably at a temperature of 205 to 220° C. and at a pressure of below 3 mbar. For example, the devolatilization may be performed in the alternative $i_b$) at a temperature of above 205° C. and at a pressure of below 3 mbar or at a temperature of above 210° C. and at a pressure of below 4 mbar.

Also, the condensation can be performed in any condensation device, in which the vapor stream drawn off from the devolatilization device is condensed into the liquid phase by cooling it down to a temperature between above of its melting point and below its boiling point at the pressure at which the condensed phase composition is condensed.

As polymerization inhibitor, any substance can be used within the scope of the present invention, which is able to inhibit an oligomerization and/or polymerization of a cyclic ester particularly in the presence of a catalyst and/or an initiator. Since the amount of polymerization inhibitor to be added to the reaction mixture and/or to the condensed phase composition decreases with the efficiency of the polymerization inhibitor, it is preferred to use a strong polymerization inhibitor. Good results are in particular achieved, when the at least one polymerization inhibitor is an imine or a diimine, such as N,N'-bis(salicylidene)-1,3-propanediamine, and/or phosphoric acid derivative, such as a phosphoric acid ester, preferably an alkanoic acid phosphate or an alkoxylated alcohol based acid phosphate compound, more preferably a stearic acid phosphate compound and most preferably a mono-$C_{4-18}$ alkyl phosphate ester, a di-$C_{4-18}$ alkyl phosphate ester or a mixture of mono-stearic acid phosphate and di-stearic acid phosphate.

In accordance with the present invention the term polymerization inhibitor is defined—in harmony with its usual definition in the relevant field—as an agent, which inhibits the action of a polymerization catalyst and of a polymerization initiator and therefore inhibits a polymerization of cyclic ester in the presence of a polymerization catalyst and of a polymerization initiator.

In a further development of the present invention it is suggested that the amount of the polymerization inhibitor in the condensed phase composition is 0.001 to 0.5% by weight based on the total weight of the composition. More preferably, the amount of the polymerization inhibitor in the condensed phase composition is 0.01 to 0.2% by weight and most preferably about 0.02 to 0.15% by weight based on the total weight of the composition. The last mentioned amounts are in particular suitable, if a strong polymerization inhibitor is used, such as an imine or a diimine and/or a phosphoric acid derivative, such as a phosphoric acid ester, preferably an alkanoic acid phosphate or an alkoxylated alcohol based acid phosphate compound, more preferably a stearic acid phosphate compound and most preferably a mono-$C_{4-18}$ alkyl phosphate ester, a di-$C_{4-18}$ alkyl phosphate ester or a mixture of mono-stearic acid phosphate and di-stearic acid phosphate.

In accordance with a particularly preferred embodiment of the present invention, the method for stabilizing a condensed phase composition in accordance with the present invention used in a process of manufacturing a polyester from cyclic ester monomer is performed in accordance with alternative $i_a$), i.e. so that the method comprises the steps of:
a) providing a cyclic ester,
b) polymerizing the cyclic ester in the presence of a catalyst and optionally an initiator in a reactor to form a reaction mixture comprising polyester and unreacted cyclic ester,
c) subjecting the reaction mixture to the devolatilization to obtain a purified polyester as the molten residue and the vapor, which includes mainly i) the at least one polymerizable cyclic ester and ii) the at least one catalyst and/or the at least one initiator and/or a reaction product or a residue of the at least one catalyst and/or the at least one initiator, and
d) subjecting the vapor stream to condensation to obtain the condensed phase composition,
wherein at least a part of the polymerization inhibitor is added to the vapor stream drawn off from the devolatilization and/or to the condensed composition.

In this embodiment, the polymerization inhibitor is directly added to the vapor stream drawn off from the devolatilization and/or to the condensed composition, respectively. Due to the addition of the polymerization inhibitor after the devolatilization, i.e. into the vapor stream drawn off from the devolatilization or to the condensed composition, a comparable low amount of polymerization inhibitor has to be added, namely exactly that amount, which is necessary, in order to avoid an oligomerization and/or polymerization of the cyclic ester included in the condensed phase composition, even after a long term storage in molten form at an elevated temperature.

In order to be able to work with the minimum amount of polymerization inhibitor to sufficiently stabilize the condensed phase composition, it is suggested in a further development of the present invention to mix the condensed phase composition during and preferably also after the addition of the polymerization inhibitor into the condensed phase composition. In this manner, a homogenous distribution of the polymerization inhibitor in the condensed phase composition is ensured so that only a minimum amount thereof has to be added to the condensed phase composition. In contrast thereto, should any inhomogeneity arise throughout the condensed phase composition, more than a minimum amount of the polymerization inhibitor would be necessary to ensure that also at those locations of the condensed phase composition having the lowest inhibitor concentration, enough inhibitor is present to reliably suppress an oligomerization or polymerization of the condensed phase composition.

The mixing may be performed already in the vapor phase or in the final condensed phase composition, by any known mixer, which is able to ensure a homogenization mixing. In particular, any suitable static mixer and/or any suitable dynamic mixer may be used. Particular good results are achieved if a mixer selected from the group consisting of SMI, SMV™, KVM, SMX™, SMX™ plus or SMXL™ Sulzer static mixers, from dynamic mixers equipped with impellers or helical ribbons, from anchor mixers as well as from any combination of two or more of the aforementioned mixers is used.

The amount of the polymerization inhibitor included in the condensed phase composition is in the aforementioned embodiment the same as described above.

This embodiment is particular useful for manufacturing a polylactic acid, a polycaprolactone or a polyglycolide, i.e. for using a cyclic ester selected from the group consisting of lactide, L-lactide, D-lactide, meso-lactide, ε-caprolactone and glycolide.

As polymerization catalyst and polymerization initiator, the aforementioned substances may be used in the present embodiment in the amounts described above as preferred. Preferably, the reaction mixture of step b) includes 0.5 to 50% by weight and preferably 1 to less than 15% by weight of cyclic ester.

Moreover, the devolatilization and condensation conditions described above as preferred may be used in the present embodiment.

Preferably, the polymerization is performed in step b) of the method in accordance with the present embodiment until a polymer having an absolute weight average molecular weight (Mw) of at least 10,000 g/mol, preferably of at least 15,000 g/mol and more preferably of at least 20,000 g/mol is obtained. The Mw is measured in accordance with the present invention by gel permeation chromatography (GPC) using an absolute calibration. The measurement is preferably performed on a Viscotek TADmax (Malvern) equipped with triple detection (Refractive Index, Viscosimeter and Right/Low Angle Light Scattering) using the solvent enhanced light scattering method, chloroform as polymer solvent, acetone as eluent and calibration of the equipment parameters carried out with PMMA standards.

Moreover, it is preferred that the polymerization is performed in step b) at a temperature of between 120° C. and 250° C., more preferably at a temperature of between 150° C. and 200° C. and most preferably at a temperature of between 160° C. and 190° C.

Optionally, a polymerization inhibitor may be included in the aforementioned embodiment—in addition to the polymerization inhibitor, which is added to the vapor stream drawn off from the devolatilization and/or to the condensed composition—before the step c), i.e. before subjecting the reaction mixture to the devolatilization to obtain a purified polyester as the molten residue and the vapor.

In accordance with another embodiment of the present invention, the method for stabilizing a condensed phase composition in accordance with the present invention used in a process of manufacturing a polyester from cyclic ester monomer is performed in accordance with alternative $i_b$), i.e. so that the method comprises the steps of:

a) providing a cyclic ester,
b) polymerizing the cyclic ester in the presence of a catalyst and optionally an initiator in a reactor to form a reaction mixture comprising polyester and unreacted cyclic ester,
c) subjecting the reaction mixture to the devolatilization to obtain a purified polyester as the molten residue and the vapor, which includes mainly i) the at least one polymerizable cyclic ester and ii) the at least one catalyst and/or the at least one initiator and/or a reaction product or a residue of the at least one catalyst and/or the at least one initiator, and
d) subjecting the vapor stream to the condensation to obtain the condensed phase composition, wherein at least a part of the polymerization inhibitor is added to the reaction mixture before step c), and wherein the devolatilization is performed at a temperature above 203° C. and at a pressure below 4 mbar or, alternatively, at a temperature above 220° C. and/or at a pressure below 5 mbar.

Because the polymerization inhibitor is added in this embodiment to the reaction mixture before step c), i.e. before subjecting the reaction mixture to the devolatilization to obtain a purified polyester as the molten residue and the vapor, which includes mainly i) the at least one polymerizable cyclic ester and ii) the at least one catalyst and/or the at least one initiator and/or a reaction product or a residue of the at least one catalyst and/or the at least one initiator, a comparable high amount of polymerization inhibitor might be added, if not in addition thereto also after the devolatilization further polymerization inhibitor is added into the vapor stream drawn off from the devolatilization and/or into the condensed composition. This is on account of the fact that depending on the specific boiling point and volatility of the polymerization inhibitor not all of the whole amount of inhibitor added to the reaction mixture before step c) might be devolatilized in step d) and transferred into the condensed phase composition.

In this embodiment, the devolatilization is performed at a temperature above 203° C. and at a pressure below 4 mbar or, alternatively, at a temperature above 220° C. and/or at a pressure below 5 mbar The aforementioned devolatilization conditions are in particular useful for devolatilizing a reaction mixture including lactide as cyclic ester, but are also useful for example for devolatilizing a reaction mixture including glycolide, ε-caprolactone or mixtures thereof as cyclic ester.

The amount of the polymerization inhibitor included into the reaction mixture before step c) is so that the content of the polymerization inhibitor in the later condensed phase composition is in the aforementioned embodiment preferably 0.001 to 0.5% by weight based on the total weight of the composition. More preferably, the amount of the polymerization inhibitor in the condensed phase composition is 0.01 to 0.2% by weight and most preferably about 0.02% to 0.15% by weight based on the total weight of the composition. The last mentioned amounts are in particular suitable, if a strong polymerization inhibitor is used, such as an imine or a diimine and/or a phosphoric acid derivative, such as a phosphoric acid ester, preferably an alkanoic acid phosphate or an alkoxylated alcohol based acid phosphate compound, more preferably a stearic acid phosphate compound and most preferably a mono-$C_{4-18}$ alkyl phosphate ester, a di-$C_{4-18}$ alkyl phosphate ester, or a mixture of mono-stearic acid phosphate and di-stearic acid phosphate. In order to achieve such an appropriate polymerization inhibitor content, when performing the devolatilization at the above mentioned preferred conditions 0.001 to 0.5% by weight, more preferably 0.01 to 0.2% by weight and most preferably about 0.02 to 0.15% by weight based on the total weight of the reaction mixture polymerization inhibitor have to be added in this embodiment to the reaction mixture before step c).

More specifically, preferably the devolatilization in step c) is performed in this embodiment at a temperature between more than 203° C. and 300° C. and at a pressure between 0.1 and less than 5 mbar, the polymerization inhibitor is selected from the group consisting of imines or diimines, phosphoric acid derivatives, such as phosphoric acid esters, alkanoic acid phosphate or alkoxylated alcohol based acid phosphate compounds and mixtures comprising two or more of the aforementioned substances, and the amount of the polymerization inhibitor added into the reaction mixture before step c) is 0.01 to 0.20% by weight based on the total weight of the reaction mixture.

More preferably, the devolatilization in step c) is performed in this embodiment at a temperature between 205° C. and 220° C. and at a pressure between 0.5 and less than 4 mbar, the polymerization inhibitor is selected from the group consisting of imines or diimines, phosphoric acid derivatives, such as phosphoric acid esters, alkanoic acid phosphate or alkoxylated alcohol based acid phosphate compounds and mixtures comprising two or more of the aforementioned substances, and the amount of the polymerization inhibitor added into the reaction mixture before step c) is 0.01 to 0.20% by weight based on the total weight of the reaction mixture.

Even more preferably, the devolatilization in step c) is performed at a temperature between 205 to 220° C. and at a pressure between 1 and less than 3 mbar, the polymerization inhibitor is selected from the group consisting of diimines, phosphoric acid esters, alkanoic acid phosphate or ethoxylated alcohol based acid phosphate compounds and mixtures comprising two or more of the aforementioned substances, and the amount of the polymerization inhibitor added into the reaction mixture before step c) is 0.01 to 0.2% by weight based on the total weight of the reaction mixture.

In order to be able to work with the minimum amount of polymerization inhibitor to sufficiently stabilize the condensed phase composition, it is suggested also for this embodiment to perform a mixing already in the vapor phase or in the final condensed phase composition, by any known mixing method as described above.

Also this embodiment is particular useful for manufacturing a polylactic acid, a polycaprolactone or a polyglycolide, i.e. for using a cyclic ester selected from the group consisting of lactide, L-lactide, D-lactide, meso-lactide, ε-caprolactone and glycolide and mixtures thereof.

As polymerization catalyst and polymerization initiator, the aforementioned substances may be used in the present embodiment in the amounts described above as preferred. Preferably, the reaction mixture of step b) includes 0.5 to 50% by weight and preferably 1 to less than 15% by weight of cyclic ester.

Moreover, the condensation conditions described above as preferred may be used in the present embodiment.

Preferably, the polymerization is performed in step b) of the method in accordance with the present embodiment until a polymer having a Mw of at least 10,000 g/mol, preferably of at least 15,000 g/mol and more preferably of at least 20,000 g/mol is obtained.

Moreover, it is preferred that the polymerization is performed in step b) at a temperature of between 120° C. and 250° C., more preferably at a temperature of between 150° C. and 200° C. and most preferably at a temperature of between 160° C. and 190° C.

Optionally, a polymerization inhibitor may be included in the aforementioned embodiment—in addition to the polymerization inhibitor, which is added to the reaction mixture before step c)—to the vapor stream drawn off from the devolatilization and/or to the condensed composition.

Apart from being used composition in a process of manufacturing a polyester, the method for stabilizing a condensed phase composition in accordance with the present invention may be used in accordance with alternative ii) in a process of manufacturing a lactide from lactic acid, wherein the method preferably comprises the steps of:
a) providing lactic acid,
b) polycondensation of the lactic acid in a reactor to form a reaction mixture comprising a polylactic acid prepolymer,
c) adding a catalyst to the reaction mixture and depolymerizing the reaction mixture
d) devolatilizing the reaction mixture to obtain a crude lactide stream,
e) subjecting the vapor stream to the condensation to obtain the condensed phase composition, wherein at least a part, preferably all of the polymerization inhibitor is added to the vapor stream drawn off from the devolatilization and/or to the condensed composition. It is advantageous to add all of the polymerization inhibitor to the vapor stream and/or condensed phase so as to minimize possible interferences with the depolymerization step, particularly when it is being carried out in a continuous process with continuous devolatilization.

A cyclic ester prepolymer is in accordance with the present invention a molecule with a number average molecular weight lower than 10,000 g/mol.

Preferably, the prepolymerization step is conducted in step b) at a pressure of 1 to 300 mbar and at a temperature of up to 250° C. to dewater the lactic acid to a prepolymer with a polymerization degree of about 7 to 20 and preferably of about 10. This prepolymerization may be either performed batchwise or continuously and is preferably performed continuously.

In a further development of the present invention, it is suggested that the depolymerization in step c) is conducted continuously at a pressure of 1 to 10 mbar and at a temperature of 150° C. to 250° C., wherein as catalyst the compounds mentioned above as catalyst and in an amount as mentioned above are preferably employed.

Moreover, the devolatilization and condensation conditions described above as preferred may be used in the present embodiment.

In a further development of the present invention it is suggested that the amount of the polymerization inhibitor in the condensed phase composition is 0.001 to 0.5% by weight based on the total weight of the composition. More preferably, the amount of the polymerization inhibitor in the condensed phase composition is 0.01 to 0.2% by weight and most preferably about 0.02 to 0.15% by weight based on the total weight of the composition. The last mentioned amounts are in particular suitable, if a strong polymerization inhibitor is used, such as an imine or a diimine and/or a phosphoric acid derivative, such as a phosphoric acid ester, preferably an alkanoic acid phosphate or an alkoxylated alcohol based acid phosphate compound, more preferably a stearic acid phosphate compound and most preferably a mono-$C_{4-18}$ alkyl phosphate ester, a di-$C_{4-18}$ alkyl phosphate ester or a mixture of mono-stearic acid phosphate and di-stearic acid phosphate.

In order to be able to work with the minimum amount of polymerization inhibitor to sufficiently stabilize the condensed phase composition, it is suggested also for this embodiment to mix the inhibitor directly in the vapor phase or in the condensed phase composition during and more preferably also after the condensation in step d), preferably making use of a mixer as described above.

In accordance with a further particularly preferred embodiment of the present invention, the condensed phase composition comprising the polymerization inhibitor is subjected to a purification step, before it is subjected to its intended use. During the purification step, impurities included in the condensed phase composition, such as polymerization catalyst and/or polymerization initiator as well as polymerization inhibitor, are removed. The so purified condensed phase composition then consists at least essentially of the cyclic ester.

Preferably, the condensed phase composition comprising the polymerization inhibitor is subjected to a melt crystallization step, a distillation step or solvent crystallization step and preferably to a melt crystallization step, to obtain a purified condensed phase composition, before it is subjected to its intended use.

More preferably, the condensed phase composition comprising the polymerization inhibitor is subjected to a melt crystallization step, to obtain a purified condensed phase composition, before it is subjected to its intended use. Preferably, the condensed phase composition is crystallized in the melt crystallization step without any solvent, which has the advantage that further steps to remove any solvents are not required.

The melt crystallization is preferably performed by a static crystallization, a dynamic crystallization or a combination thereof. For this purpose, any suitable type of static crystallizers and/or of dynamic crystallizers known to a person skilled in the art may be used. A particular preferred example for a dynamic crystallizer is a falling film crystallizer.

Static crystallization can be performed by using tubes which are heated or cooled by an internal circulation of heat transfer medium or alternatively by using plates, which can be oriented either vertically, horizontally or at any preferred orientation, wherein the plates are suspended in the molten feed which needs to be purified by crystallization. In a first step, the substance to be purified is crystallized at the surface of the vertical plates, wherein the remaining melt including predominantly impurities is removed as a first residue. In a second step, the crystallized mass is partially melted or "sweated", respectively, to melt predominantly remaining impurities included in the crystals and the resulting melt is then removed as a second residue from the crystallizer. Then, in a third step the so purified crystals are molten and removed as product melt. Static crystallization has the advantage of high flexibility, of wide operating range, of easy operation since there is no crystal slurry handling and no filtration, of high reliability and of low operation costs. In particular, static crystallization is preferred over dynamic crystallization when thermally sensitive substances are purified.

A falling film crystallizer consists of a system of essentially vertical tubes. During the crystallization process, the composition to be purified and the heat transfer medium both flows as a falling film down on the surfaces of the tubes. However, while the composition to be purified flow as a falling film down on the inside surface of the tubes, the heat transfer medium used for cooling and heating is distributed to wet the outer surface of the tubes. During the crystallization, cold heat transfer medium is used to chill the tubes, so that the substance to be purified crystallizes on the inside surface of the tubes, wherein the remaining melt including predominantly impurities is removed from the crystallizer as a first residue. After the crystallization, a partial melting or "sweating", respectively, is induced by slightly raising the temperature of the heat transfer medium, in order to melt predominantly remaining impurities included in the crystals and the resulting melt is then removed as a second residue from the crystallizer. Then, the final melting of the crystals is performed by applying higher temperatures to provide the purified liquid, which is removed as product melt. Falling film crystallization leads to a high capacity and is characterized by an easy operation since there is no crystal slurry handling and no filtration, by a high reliability and by low operation costs.

Preferably, the crystallization is performed by cooling the condensed phase composition at a temperature which is 0.1 to 50° C. lower than the solidification point of the composition, and more preferably by cooling the condensed phase composition at a temperature which is 0.5 to 25° C. lower than the solidification point of the composition In accordance with an alternative embodiment to the aforementioned, no purification of the condensed phase composition is conducted before it is subjected to its intended use. In this embodiment, the condensed phase composition is used in the later application, such as polymerization to polyester, such as polylactic acid, in unpurified form, wherein respective higher amounts of catalyst and initiator are added to contemplate for the remaining polymerization inhibitor.

The intended use of the condensed phase composition may be in particular its recycling into a reactor, such as a polymerization reactor used for the production of polyester, such as polylactic acid, or to a prepolymerization reactor used for the production of polyester-prepolymer as precursor for a depolymerization to a cyclic diester, such as lactide.

The reactor, to which the condensed phase composition is recycled, may be in particular a loop reactor or a plug flow reactor.

In accordance with another specific aspect, the present invention relates to a method for stabilizing a condensed phase composition used in a process of manufacturing a polyester from cyclic ester monomer, wherein the method preferably comprises the steps of:
  a) providing a cyclic ester,
  b) polymerizing the cyclic ester in the presence of a catalyst and optionally an initiator in a reactor to form a reaction mixture comprising polyester and unreacted cyclic ester,
  c) subjecting the reaction mixture to the devolatilization to obtain a purified polyester as the molten residue and the vapor, which includes mainly i) the at least one polymerizable cyclic ester and ii) the at least one catalyst and/or the at least one initiator and/or a reaction product or a residue of the at least one catalyst and/or the at least one initiator, and
  d) subjecting the vapor stream to the condensation to obtain the condensed phase composition,
wherein at least one polymerization inhibitor is added as stabilizer to the reaction mixture before step c), and, wherein the devolatilization is performed at a temperature of above 220° C. and/or at a pressure below 5 mbar.

Preferably, the devolatilization is performed at a temperature of between above 220° C. and 300° C. and/or at a pressure of between 1 and 5 mbar and more preferably at a temperature of between above 220° C. and 250° C. and/or at a pressure of between 1 and 3 mbar.

As cyclic ester, catalyst and initiator the compounds described above for the other embodiments may be used in the aforementioned amounts.

According to another aspect, the present invention relates to a plant for stabilizing a condensed phase composition used in a process of manufacturing a polyester from cyclic ester monomer, wherein the plant comprises:
  a) at least one reactor for polymerizing cyclic ester in the presence of a catalyst and optionally an initiator to form a reaction mixture comprising polyester and unreacted cyclic ester,
  b) at least one devolatilization device to separate a low boiling vapor phase comprising cyclic ester and the catalyst and/or the initiator and/or a reaction product or a residue of the at least one catalyst and/or the at least one initiator from a molten residue including mainly polymerized cyclic ester, and
  c) at least one condenser device to condense the vapor stream to a condensed phase composition,
wherein the plant further comprises at least one feeding line for feeding a polymerization inhibitor either into the vapor stream drawn off from the devolatilization and/or to the condensed composition.

Preferably, the plant further comprises a mixer, which is located e.g. in the condenser or downstream of the condenser, which is adapted to homogeneously mix the polymerization inhibitor in the condensed phase composition. Preferably, the mixer is a mixer as described above. Alternatively, the mixer may be located so that the mixing is performed already in the vapor phase.

Moreover, it is preferred that the plant further comprises at least one purification device downstream of the condenser, which allows to remove impurities and in particular polymerization catalysts, polymerization initiators and polymerization inhibitors from a cyclic ester including condensed phase composition. Preferably, the purification device is a static crystallizer, a dynamic crystallizer or a combination thereof. For this purpose, any type of static crystallizers and/or of dynamic crystallizers known to a person skilled in the art may be used. A particular preferred example for a dynamic crystallizer is a falling film crystallizer.

Preferably, the at least one purification device is connected with the condenser via a line and further comprises a return line leading from the purification device back to the reactor system.

In accordance with a particular preferred embodiment of the present invention, the vapor stream drawn off from a devolatilization device is subjected to a wash step in a wash section of the plant. For instance, the vapor stream drawn off from a devolatilization device is conducted into a countercurrent column, which is preferably kept under vacuum, and contacted there with an aqueous solution, in order to dissolve and at least partially hydrolyze the lactide included in the vapour stream. The resulting mixture is then preferably led to a heat exchanger, where it is heated to a temperature of for instance 10 to 95° C. and preferably of 10 to 60° C., before it is led to a reactor, where it is kept with a residence time of at least 0.1 to 30 minutes and preferably of at least 0.1 to 10 minutes at this temperature for allowing a complete or at least nearly complete dissolution and hydrolysis of the lactide in the aqueous solution, before it is led to a further heat exchanger, where it is cooled to a temperature of for instance 5 to 25° C., preferably of 5 to 15° C. and more preferably of 7 to 12° C. Thereafter, the cooled mixture is recirculated as aqueous solution to the countercurrent column. A partial stream of the recirculated mixture is removed from any location of the recirculation system, such as before leading the mixture to the first heat exchanger, and then disposed.

It has been found during the present invention that in such wash sections conventional phosphate-based polymerization inhibitors, such as mono-stearic acid phosphates and di-stearic acid phosphates and their mixtures, often cause problems of fouling of the wash section. Such fouling may cause a blockage of the lines and solid residues, which may undesirably accumulate within the wash section as an insoluble fraction. Without wishing to be bound by any particular mechanism, it is considered that this fouling is caused by the devolatilization of the polymerization inhibitors and/or their degradation products and that these are insoluble in the acidic aqueous solution present in the washing section.

One possible approach to solve this problem is to use a phosphate-based polymerization inhibitor which is liquid at room temperature and also highly volatile, such as dibutyl phosphate, which is a liquid at room temperature with a boiling point of 275.3° C. at 760 mmHg, and therefore highly volatile under vacuum conditions as used in such wash sections. It was considered that such volatile phosphate-based polymerization inhibitors and/or their degradation products when transferred together with the gas stream at the outlet of a devolatilization vessel to the wash section, would be easily devolatilized there and would thus not cause any fouling in the wash section and the downstream recirculation system. Alternatively, the fraction of inhibitor and/or degradation products which might be transferred to the wash section and not be readily devolatilized there, would be there in a liquid state, thus again without causing any fouling in the wash section parts. However upon testing, it was found in the present invention that although no fouling occurred in the portion of the wash section with such highly volatile polymerization inhibitors, surprisingly significant fouling occurred in the upstream first and/or second devolatilization chambers. Such fouling leads to the formation of a dark-colored insoluble solid coating on the surface of said chambers. As a function of the production run time the color, of the resulting polyester polymer product is then also found to deteriorate as fouling proceeded. Again without wishing to be bound by any particular mechanism, it is considered that this fouling is caused by the ready vapor-phase thermal degradation of such highly volatile phosphate-based polymerization inhibitors within the chamber to give a solid residue on the chamber surfaces.

Surprisingly it has subsequently been found that these problems of fouling in both the devolatilization chambers and their downstream wash sections for removing an ester from the vapor and recirculation for reducing the ester content may be alleviated by using as a polymerization inhibitor either a diimine, such as N,N'-bis(salicylidene)-1,3-propanediamine (CAS no. 120-70-7), or a phosphate ester according to the subsequently described general formula (I). Again without wishing to be bound by any particular mechanism, it is considered that these phosphate esters alleviate these problems of fouling in the devolatilization chambers by being sufficiently high in molecular weight—and thus involatile—by controlling the chain lengths of the moieties. In addition by imparting hydrophilicity to the phosphate ester via the polar general structure as in the subsequent general formula (II), the phosphate ester and/or its degradation products are sufficiently hydrophilic and thus soluble in acidic aqueous solutions so as to avoid problems of fouling in the wash section and its recirculation system. Moreover, it is considered that such diimines, such as N,N'-bis(salicylidene)-1,3-propanediamine, function similarly in balancing the requisite volatility and hydrophilicity properties of the polymerization inhibitor. Therefore, such phosphate esters and diimines may advantageously be employed in polymerization processes of cyclic esters to produce polyesters, particularly those in which devolatilization vessels and/or wash sections are employed.

According to another aspect, the present invention relates to a condensed phase composition, which is obtainable with a method as described above.

The condensed phase composition preferably comprises:
i) at least 95% by weight of cyclic ester,
ii) at least 0.5 ppm of at least one catalyst capable of catalyzing a polymerization of the cyclic ester and/or at least 0.01 mmol per kg of at least one initiator capable of initiating a polymerization of the cyclic ester and
iii) 0.001 to 0.5% by weight of polymerization inhibitor.

As the polymerization inhibitor, any substance can be used within the scope of the present invention, which is able to inhibit an oligomerization and/or polymerization of a cyclic ester particularly in the presence of a catalyst and/or an initiator. Since the amount of polymerization inhibitor to be added to the reaction mixture and/or to the condensed phase composition decreases with the efficiency of the polymerization inhibitor, it is preferred to use a strong polymerization inhibitor. Good results are in particular achieved, when the at least one polymerization inhibitor is an imine or a diimine, such as N,N'-bis(salicylidene)-1,3-propanediamine and/or a phosphoric acid derivative, such as a phosphoric acid ester, preferably an alkanoic acid phosphate or an alkoxylated alcohol based acid phosphate compound, more preferably a stearic acid phosphate compound and most preferably a mono-$C_{4-18}$ alkyl phosphate ester, a di-$C_{4-18}$ alkyl phosphate ester or a mixture of mono-stearic acid phosphate and di-stearic acid phosphate.

In accordance with another aspect, the present invention relates to the use of the aforementioned condensed phase composition for the production of a polyester, wherein before the start of the polymerization catalyst and/or polymerization initiator are added to the condensed phase composition, so that the total amount of polymerization catalyst is 1 ppm to 1% by weight and/or the total amount of polymerization initiator is 0.1 to 50 mmol/kg based on the total amount of condensed phase composition.

In accordance with another aspect, the present invention relates to the use of the aforementioned condensed phase composition for the production of a polyester, wherein the condensed phase composition is mixed with a melt comprising a cyclic ester and/or a polyester, with the optional addition of a polymerization catalyst and or polymerization initiator, so that the total amount of polymerization initiator is 0.1 to 50 mmol/kg by weight based on the total amount of final composition, wherein the so obtained mixture is then further polymerized.

This embodiment is in particular suitable for the production of polylactic acid.

According to a further embodiment of the present invention, the polymerization inhibitor used in the method is selected from the group consisting of mono or diimines, phosphoric acid esters, alkoxylated alcohol based acid phosphates, mono- and/or di-alkyl phosphates, $RPO_4H_2$ and/or $R_2PO_4H$, wherein each R is independently a $C_{6-16}$ linear, branched or cyclic alkyl group or a combination thereof.

Due to the reasons set out above, preferably as polymerization inhibitor a diimine is used, such as N,N'-bis(salicylidene)-1,3-propanediamine, and/or a phosphate ester according to the general formula (I)

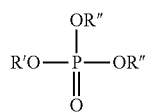

wherein preferably R', R" and R'" have independently the general structure as in general formula (II)

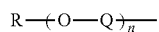

wherein i) n>0 and Q is independently a $C_{1-16}$ linear, branched or substituted alkyl group, and R is independently an H or linear, branched, cyclic or substituted alkyl group or a phenyl group derivative, or wherein ii) n=0 and R is independently an H or a $C_{6-16}$ linear, branched, cyclic or substituted alkyl group or a phenyl group derivative. Preferably, at least one of R', R" and R'" is an H in the general formula (I).

Preferably, in the above formula (I) either i) R' is an H and R" and R'" are according to the general Formula (II) or ii) R' and R" are an H and R'" is according to the general formula (II).

Moreover, n is in the general formula (II) preferably larger than 0, more preferably an integer of 2 to 20 and even more preferably an integer of 2 to 11.

In accordance with a particular preferred embodiment, n is in the general formula (II) an integer of 2 to 20 and R is an alkyl group. Even more preferable, n is an integer of 2 to 20, R is an alkyl group with less than 16 carbon atoms and Q is a $CH_2$—$CH_2$ group. Preferred examples therefore are poly(oxy-1,2-ethanediyl), alphaisotridecyl-omega-hydroxyphosphate (CAS 9046-01-9) and poly(oxy-1,2-ethanediyl), alpha-hydro-omega-hydroxy-mono-$C_{12-15}$-alkyl ether phosphates (CAS 68071-35-2).

By adding such a preferred class of polymerization inhibitor to the reaction mixture, the transparency and/or visual appearance of the material is quite good and often haze in the polymerization product can be reliably minimized, and, surprisingly issues related to blockages, phase separations, generation of solid by-product sediments and/or fouling in the equipment and/or cleaning of the equipment, in the devolatilization and/or in the wash sections can be minimized. Also, such preferred classes of polymerization inhibitors enable the production of higher viscosity polymer compared to other inhibitors, such as mono and distearyl acid phosphates, which are known in the prior art. In addition, it has been found that these polymerization inhibitors may be used in all conventional known methods for adding polymerization inhibitors, such as those known from EP 2 698 394 A1, WO 2014/027037 A1 or U.S. Pat. No. 5,770,682.

Apart from that, the polymerization inhibitor may be in general a [poly(oxy-1,2-ethanediyl) mono-alkyl-ether phosphate], a [poly(oxy-1,2-ethanediol)-phenyl-hydroxy phosphate] or a [poly(oxy-1,2-ethanediyl) omega-hydroxy phosphate].

In addition, it is preferred that the cyclic ester in alternatives $i_a$) and $i_b$) of the method in accordance with the present invention is lactide so that polylactic acid is produced in the process.

Moreover, it is preferred that the concentration of the compound in the composition is 0.001 to 0.5% by weight and more preferably 0.02 to 0.15% by weight.

Specific embodiments in accordance with the present invention are now described with reference to the appended drawings.

FIG. 1 shows a plant for stabilizing a condensed phase composition in a process of manufacturing a polyester from cyclic ester monomer in accordance with a first embodiment of the present invention.

Figure 1:
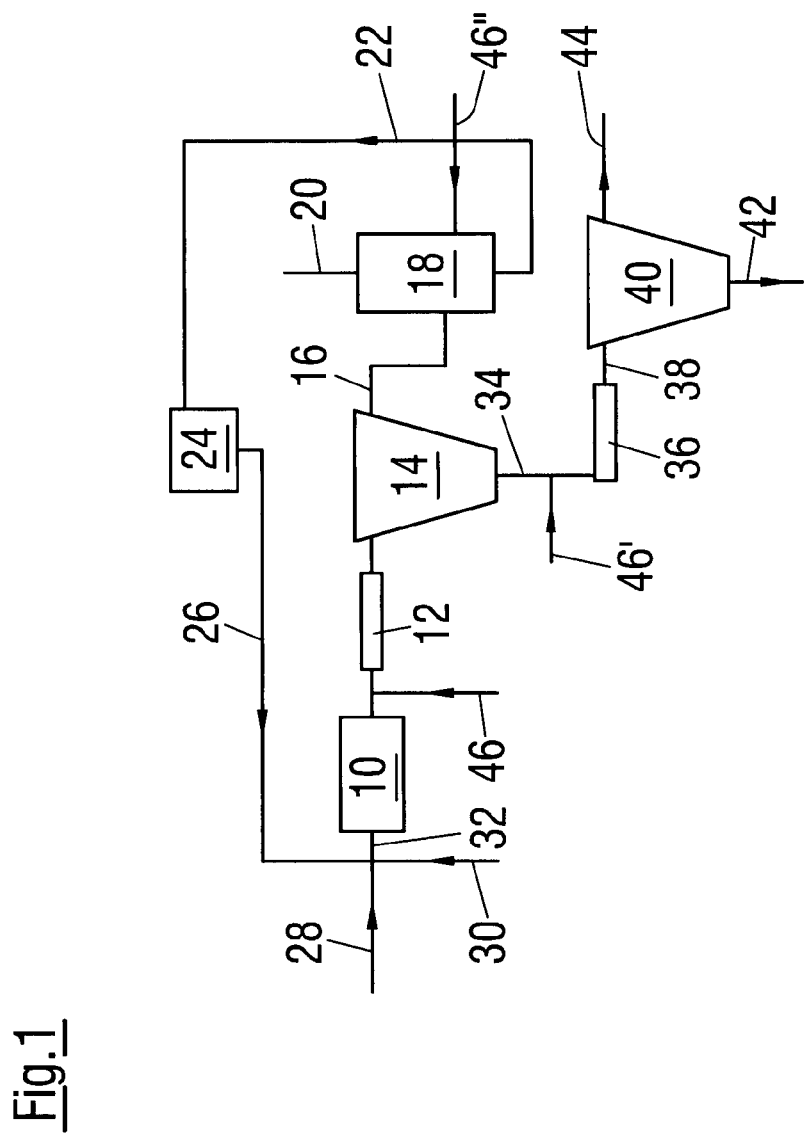
FIG. 1 is a schematic drawing of a plant for stabilizing a condensed phase composition in a process of manufacturing a polyester from cyclic ester monomer in accordance with a first embodiment of the present invention.

The plant comprises a reactor system 10 for polymerizing cyclic ester in the presence of a catalyst and optionally an initiator to form a reaction mixture comprising polyester and unreacted cyclic ester, downstream thereof a unit 12 and downstream thereof a first devolatilization chamber 14. Unit 12 is a static mixer, a heat exchange or a combination thereof.

From the upper part of the first devolatilization chamber 14 a vapor line 16 leads to a condenser 18, which comprises a gas removal line 20 and a fluid removal line 22. The fluid removal line 22 leads to a static melt crystallizer 24, which is connected by means of a recycle line 26 with the feed of the reactor system 10. Into the recycle line 26, a cyclic ester supply line 28 as well as with a supply line 30 for polymerization catalyst and polymerization initiator leads. Lines 26, 28 and 30 combine to the feed line 32 leading into the reactor system 10.

From the lower part of the first devolatilization chamber 14 a liquid line 34 leads to a unit 36 and from there via line 38 to a second devolatilization chamber 40, wherein unit 36 is a static mixer, a heat exchanger or a combination thereof. The second devolatilization chamber 40 comprises a polymer withdrawal line 42 and a vapor removal line 44.

Three supply lines for polymerization inhibitor 46, 46', 46''' are provided, namely a first one 46 leading into the line leading to the unit 12, a second one 46' leading into the line 34 leading to the unit 36 and a third one 46" leading into the condenser 18.

Subsequently, the continuous operation of this plant is described by means of using lactide as cyclic ester starting material for preparing polylactic acid.

Fresh lactide is supplied via supply line 28 and fresh polymerization catalyst, namely tin octoate, and fresh polymerization initiator, namely 2-ethylhexanol, are supplied via supply line 30 into the recycle line 26. The mixture of these streams is fed via the supply line 32, which optionally includes a static mixer, into the reactor system 10, which comprises one or more polymerization reactors and preferably one to three loop reactors and optionally at least one plug flow reactor. The mixture polymerizes in the reactor system 10 forming a reaction mixture or reaction mixture, respectively, which contains polylactic acid having a Mw of at least 20,000 g/mol, unreacted lactide, polymerization catalyst and polymerization initiator. Via the supply line 46, at least a polymerization inhibitor, for example a mixture of mono-stearic acid phosphate and di-stearic acid phosphate, is added into this stream and the combined stream is led into the unit 12, where it is homogeneously mixed.

The so obtained mixture is then conveyed into the first devolatilization chamber 14, which is operated in this case at a temperature of 190° C. and at a pressure of 15 mbar. Under these conditions, in the devolatilization chamber 14 a vapor stream including mainly unreacted lactide and the catalyst and/or the initiator and/or a reaction product or a residue of the at least one catalyst and/or the at least one initiator as well as a liquid stream including mainly the polylactic acid product, a part of the catalyst, a part of the initiator and all or at least essentially all of the polymerization inhibitor fed into the stream via line 46 phase separate. The reason that all or at least essentially all of the polymerization inhibitor is included in the liquid stream removed from the first devolatilization chamber 14 via line 34 is that the polymerization inhibitor, namely the mixture of mono-stearic acid phosphate and di-stearic acid phosphate, has at these devolatilization conditions, namely at a temperature of 190° C. and at a pressure of 15 mbar, a so low volatility that it is not transferred in the devolatilization chamber into the vapor stream. It has to be noted that the polymerization inhibitor is added in this case via line 46 not for the purpose of stabilizing the condensed phase composition into the stream drawn off from the reactor system 10, but for the sole purpose of stabilizing the polylactic acid product, i.e. in order to avoid a further polymerization of the polylactic acid.

Via line 46' further polymerization inhibitor is added into the crude product stream and the so obtained mixture is conveyed into the unit 36, where it is homogeneously mixed. Thereafter, the raw product is subjected to a second devolatilization in the second devolatilization chamber 40, where residual low boiling impurities, namely mainly lactide, are removed from the purified polylactic acid product stream. While the purified polylactic acid product stream is removed from the plant via the polymer line 42, the residual impurities are removed from the plant via the vapor removal line 44. Alternatively, the residual impurities including lactide may be fed into the vapor line 16 or condensed and fed into the fluid removal line 22.

The vapor obtained in the first devolatilization chamber 14 is drawn off from the first devolatilization chamber 14 via the vapor line 16 and is fed into the condenser 18. In the condenser, a condensed phase enriched with lactide is obtained. Moreover, a mixture of mono-stearic acid phosphate and di-stearic acid phosphate is supplied as polymerization inhibitor via line 46" in the condenser 18 into the condensed phase composition obtained therein and mixed to obtain a homogeneous mixture. The condensed phase composition is withdrawn from the condenser 18 as a homogeneous mixture and conveyed via the recycle line 26 into the static melt crystallizer 24, where the lactide is separated from impurities, namely from remaining polymerization catalyst, remaining polymerization initiator and polymerization inhibitor. The so obtained purified lactide is recycled into the reactor system 10 via lines 26.

Due to the addition of the polymerization inhibitor via line 46" in the condenser 18 into the condensed phase composition, this composition is stabilized against oligomerization and/or polymerization initiated by the catalyst and/or initiator included therein, so that the stabilized condensed phase composition can be incubated for a long period of time, i.e. in particular for several days, such as for at least 10 days, at elevated temperatures of for example 120° C., i.e. in the molten condition, without any oligomerization and/or polymerization of the lactide, which would not only lead to an unwanted consumption of the lactide, but in particular also to an unwanted viscosity increase of the condensed phase composition, which would make it difficult, if not impossible, to convey the condensed phase composition into the crystallizer.

Figure 2:
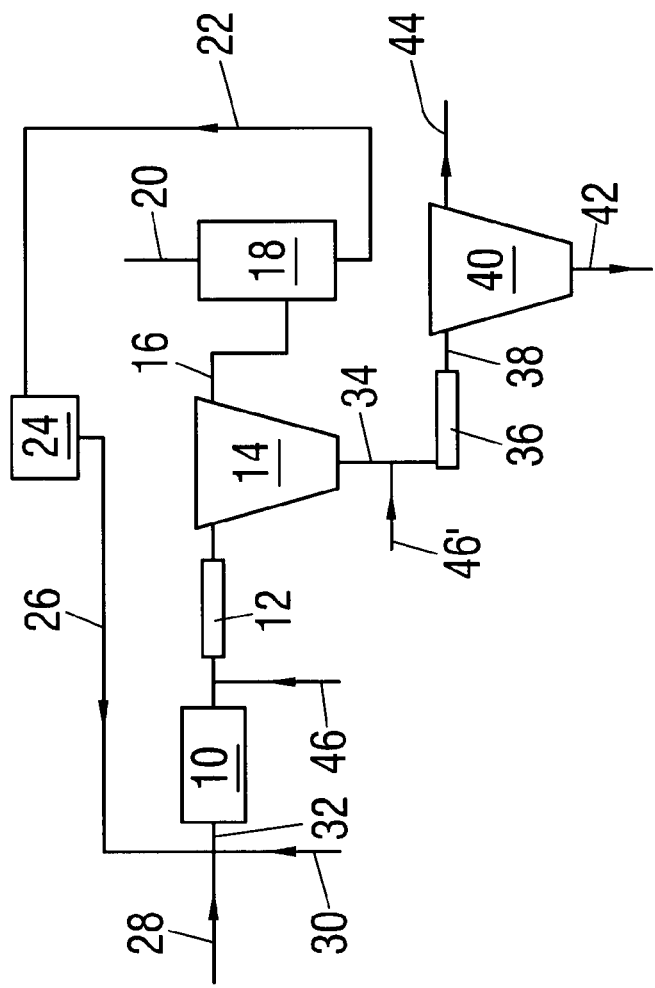
FIG. 2 is a schematic drawing of a plant for stabilizing a condensed phase composition in a process of manufacturing a polyester from cyclic ester monomer in accordance with a second embodiment of the present invention.

The plant for stabilizing a condensed phase composition in a process of manufacturing a polyester from cyclic ester monomer in accordance with a second embodiment of the present invention, as shown in FIG. 2, is identical to that of the plant shown in FIG. 1 except that the supply line for polymerization inhibitor 46" into the condenser 18 is missing. In this embodiment more mixture of mono-stearic acid phosphate and di-stearic acid phosphate as polymerization inhibitor is supplied via line 46 into the reaction mixture drawn off from the reaction system 10 and the devolatilization is performed in the first devolatilization chamber at a higher temperature and under more reduced pressure, namely at a temperature of 215° C. at a pressure of 3 mbar. On account of this reason, a sufficient amount of polymerization inhibitor is transferred in the vapor phase drawn off from the first devolatilization chamber 14 via line 16 so that in the condenser 18 a condensed phase composition is obtained, which is stabilized as well as that obtained with the plant shown in FIG. 1.

Figure 3:
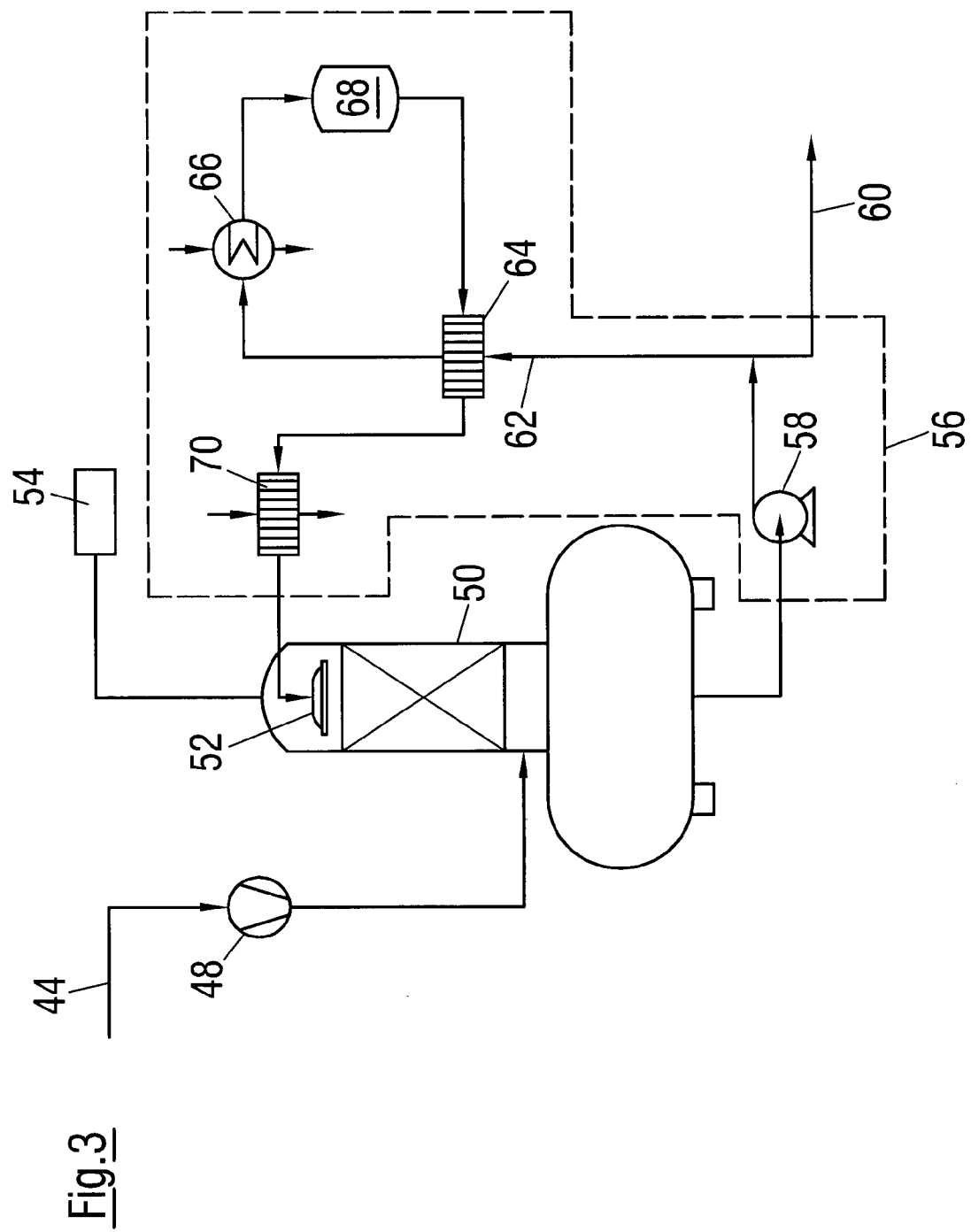
FIG. 3 is a schematic drawing of a wash section located downstream of a plant shown in FIG. 1 or FIG. 2.

FIG. 3 shows a wash section with a recirculation system or circulate, respectively, for removing lactide from the vapor drawn off from the second devolatilization chamber 40 as stream 44 shown in FIGS. 1 and 2. The vapor stream 44 is passed through a steam ejector 48 and then fed into a countercurrent column 50, in which it is contacted with aqueous solution, which is distribuited at the head of the countercurrent column 50 by means of a distributor 52. The column 50 is kept under vacuum by means of the vacuum system 54. Lactide from the vapor stream 44 dissolves and at least partially hydrolyzes in the aqueous solution and is then withdrawn from the column 50 and introduced into the recirculation system 56, where it pumped by means of pump 58. A partial stream of this mixture is removed from the plant via the removal line 60 and disposed. The remaining partial stream of the mixture is pumped through a first heat exchanger 64 and a second heat exchanger 66, where it is heated to a suitable temperature for complete or at least nearly complete dissolution and hydrolysis of the lactide, before it is transported into the reactor 68, where it is incubated for a sufficient time to effect a complete or at least nearly complete dissolution and hydrolysis of the lactide. Afterwards, the mixture is pumped through the first heat exchanger 64 and through a third heat exchanger 70, before it is led to the distributor 52.

Alternatively to the embodiment shown in FIG. 3, the washing section may be connected with the vapor 16 drawn off from the first devolatilization chamber 14. It may even replace in this embodiment the condenser, or it may be connected with the gas removal line 20 in addition to the condenser 18.

Likewise it will be understood that the washing section for removing lactide from the vapor drawn off from the second devolatilization chamber 40 may also optionally be used together with a condenser.

Accordingly the polymerization inhibitor and/or its decomposition and/or hydrolysis products may often as well be detected in the recirculation system 56 for these embodiments having a washing section.

Subsequently, the present invention is described by means of non-limiting examples.

EXAMPLE 1

Example 1-1

Lactide was melted and fed together with tin(II) octoate as catalyst and with 2-ethylhexanol as initiator into a continuous polymerization reactor, which was composed of a loop reactor and a downstream located plug flow reactor, where the lactide was polymerized in the presence of the catalyst and of the initiator. At the end of the polymerization reactor, the content of unreacted lactide in the reaction mixture was 4 to 6% by weight.

Then, 0.15 to 0.2% by weight of a melted phosphorus compound available as commercial product ADK STAB AX-71 from the company Adeka Palmarole, which is a mixture of mono and distearyl acid phosphate, were added as polymerization inhibitor to the reaction mixture as a side stream and mixed using stating mixers. In order to remove the unreacted lactide, the so obtained reaction mixture was subjected to devolatilization in a devolatilization apparatus as described in U.S. Pat. No. 7,942,955 B2 at a temperature of 224° C. and at a pressure of 4.9 mbar, wherein a fraction enriched with unreacted lactide was obtained as vapor stream and a polymer rich phase was obtained as molten residue. The vapor stream was then condensed into a condensed phase and collected in a hot tank connected with a vapor outlet line of the devolatilization vessel. The hot tank was set at a temperature of 100 to 105° C.

Thereafter, the content of phosphorus in the condensed phase composition was measured by $^{31}$P-NMR and by ICP-MS. Accordingly, the condensed phase contained 34 ppm of phosphorus.

This example shows that by performing the devolatilization of a composition including unreacted lactide and the phosphorus compound ADK STAB AX-71 as polymerization inhibitor at a temperature of 224° C. and at a pressure of 4.9 mbar, a measurable amount of the polymerization inhibitor is transferred into the condensed phase.

Example 1-2

The polymer rich molten residue obtained after the devolatilization in example 1-1 was subjected to a further devolatilization, which was performed at a temperature of 225° C. and at a pressure of 1.0 mbar. The resulting vapor stream was condensed and the so obtained condensed phase was analysed concerning the phosphorus content by $^{31}$P-NMR and by ICP-MS.

Accordingly, the condensed phase contained 260 ppm of phosphorus.

This example shows that by performing the devolatilization of a composition including unreacted lactide and the phosphorus compound ADK STAB AX-71 as polymerization inhibitor at a temperature of 225° C. and at a pressure of 1.0 mbar, a measurable amount of the polymerization inhibitor is transferred into the condensed phase.

COMPARATIVE EXAMPLE 1

Comparative Example 1-1

Example 1-1 was repeated except that the devolatilization was performed at a temperature of 203° C. and at a pressure of 4.0 mbar. The resulting vapor stream was condensed and the so obtained condensed phase was analysed concerning the phosphorus content by $^{31}$P-NMR and by ICP-MS.

Accordingly, the condensed phase contained no measurable amounts of the phosphorus compound.

Comparative Example 1-2

Example 1-1 was repeated except that the devolatilization was performed at a temperature of 199° C. and at a pressure of 3.1 mbar. The resulting vapor stream was condensed and the so obtained condensed phase was analysed concerning the phosphorus content by $^{31}$P-NMR and by ICP-MS.

Accordingly, the condensed phase contained no measurable amounts of the phosphorus compound.

The comparative examples 1-1 and 1-2 show that by performing the devolatilization of a composition including unreacted lactide and the phosphorus compound ADK STAB AX-71 as polymerization inhibitor at a temperature of about 200° C. and at a pressure of about 3 to 4 mbar, no measurable amount of the polymerization inhibitor is transferred into the condensed phase.

EXAMPLE 2

Example 2-1

Lactide was melted and fed together with 100 ppm tin(II) octoate as catalyst and with 20 mmol initiator of 2-ethylhexanol as initiator per kg lactide into a continuous polymerization reactor, which was composed of a loop reactor and a downstream located plug flow reactor, where the lactide was polymerized in the presence of the catalyst and of the initiator. At the end of the polymerization reactor, the content of unreacted lactide in the reaction mixture was 4% by weight.

Then, 0.15 to 0.2% by weight of a melted phosphorus compound available as commercial product ADK STAB AX-71 from the company Adeka Palmarole were added as polymerization inhibitor to the reaction mixture as a side stream and mixed using stating mixers. In order to remove the unreacted lactide, the so obtained reaction mixture was subjected to devolatilization in a devolatilization apparatus as described in U.S. Pat. No. 7,942,955 B2 at a temperature of 224° C. and at a pressure of about 4.0±1.0 mbar, in which a fraction enriched with unreacted lactide was obtained as vapor stream and a polymer rich phase was obtained as molten residue. The vapor stream was then condensed into a condensed phase and collected in a hot tank connected with a vapor outlet line of the devolatilization vessel. The hot tank was set at a temperature of 100 to 105° C.

Thereafter, the stability of the condensed phase was evaluated by determining the degree of conversion of the polymerizable cyclic ester included in the condensed phase after addition of 150 ppm of tin octoate as catalyst and of 100 mmol/kg of ethyl-hexanol as initiator to the condensed phase composition and a subsequent heat treatment of the condensed phase under inert atmosphere conditions for 12 hours at 160° C. The degree of conversion of the polymerizable cyclic ester in the condensed phase composition was calculated as $100 \cdot (c_0 - c_F)/c_0$, wherein $c_0$ is the initial concentration of the cyclic ester in the condensed phase composition obtained by the condensation of the vapor stream and $c_F$ is the concentration of the cyclic ester in the condensed phase composition after the aforementioned heat treatment. Both concentrations $c_0$ and $c_F$ were measured with gas chromatography.

The degree of conversion of the polymerizable cyclic ester in the condensed phase was below 5% by weight.

This example shows that by adding a polymerization inhibitor to the reaction mixture and performing the devolatilization of the so obtained composition including unreacted lactide, catalyst, polymerization initiator and the phosphorus compound ADK STAB AX-71 as polymerization inhibitor at a temperature of 224° C. and at a pressure of about 4.0 mbar, before the obtained vapor stream is condensed, a stable condensed phase is obtained because a measurable amount of the polymerization inhibitor is transferred into the condensed phase and protects the unreacted lactide from being polymerized.

Example 2-2

An aliquot of the condensed phase obtained after condensation in example 2-1 was purified by crystallization.

More specifically, a glass vial was filled with an 9.6 g of the condensed phase and then sealed. The composition was melted in an oven at 120° C. and then subjected to a first crystallization step by cooling it down to 90° C. After 20 h, an amount equal to 8.5 g corresponding to a weight fraction of 88.5% of the initial stabilized composition were solidified into a solid crystalline fraction C1, while the remaining 1.1 g corresponding to a weight fraction of 11.5% of the initial composition remained a liquid fraction L1.

After removing from the glass vial the liquid fraction L1, the vial was sealed again and the solid fraction C1 was subjected to a second purification step by first melting the fraction C1 and then cooling it down to 95° C. for 3 h, then to 90° C. for 18 h and finally to 85° C. for 7 h. At the end of this second purification step, the composition phase separated into a liquid phase L2 (11.3% by weight) and a solid crystalline phase C2 (88.7% by weight).

The content of phosphorus was measured for each phase. While the solid crystalline fraction C1 obtained after the first crystallization step contained 20 ppm of phosphorus and the solid crystalline fraction C2 obtained after the second crystallization step contained 13 ppm of phosphorus, the liquid fraction L1 obtained after the first crystallization step contained 115 ppm of phosphorus and the liquid fraction L2 obtained after the second crystallization step contained 86 ppm of phosphorus.

These results show that the polymerization inhibitor can be substantially removed from the condensed phase by crystallization.

COMPARATIVE EXAMPLE 2

Comparative Example 2-1

Example 2-1 was repeated except that the devolatilization was performed at a temperature of 204° C. and at a pressure of 4.0 mbar and except that no polymerization inhibitor was added.

The degree of conversion of the polymerizable cyclic ester in the condensed phase was 78.2±0.6% by weight.

This comparative example shows that a condensed phase obtained by devolatilizing a reaction mixture containing polymerizable cyclic ester, polymerization catalyst and polymerization initiator and by then condensing the vapor phase obtained in the devolatilization, without adding any polymerization inhibitor to the composition is not stable, but polymerizes at elevated temperatures significantly.

Comparative Example 2-2

Example 2-1 was repeated except that the devolatilization was performed at a temperature of 203° C. and at a pressure of 4.0 mbar.

The degree of conversion of the polymerizable cyclic ester in the condensed phase was 50.7±3.3% by weight.

This comparative example shows that a condensed phase obtained by devolatilizing a reaction mixture containing polymerizable cyclic ester, polymerization catalyst, a polymerization initiator and polymerization inhibitor at a temperature of about 200° C. and at a pressure of about 4 mbar and by then condensing the vapor phase obtained in the devolatilization is not stable, but polymerizes at elevated temperatures significantly.

EXAMPLE 3

A plant as shown in FIG. 1 was operated with lactide as cyclic ester. Poly(oxy-1,2-ethanediyl), alpha-hydroxy-omega-hydroxy-mono-$C_{12-15}$-alkyl ether phosphate (CAS-No: 68071-35-2) was used as polymerization inhibitor and was added to the polymerization stream at the outlet of the loop and plug flow reactor 10 at position 46. Three runs were operated during several days of continuous operation, wherein the inhibitor concentrations were 0.04% by weight, 0.05% by weight and 0.1% by weight, respectively, relative to the lactide fed to the polymerization reactor. A wash system as shown in FIG. 3 was in fluid connection with vapor stream 44 drawn off from the outlet of the second devolatilizer 40. The polymerization plant was kept in operation for several days in a raw and the occurring of fouling was monitored continuously during the plant operation.

No evidence of solid depositions could be observed neither in the countercurrent column 50 nor in the recirculation system 56.

For each of the three runs, during the operation of the plant the polylactic acid product at the removal line 42 of the polymerization plant was pelletized using a conventional underwater pelletizer and samples in pellets in the mm size range were collected for characterization. The obtained results are summarized in Tables 1 and 2.

TABLE 1

Characterization results of Polylactide (PLA) pellets.

| Run | Residual monomer [%] | ΔRM @220° C./60 min | ΔRM @250° C./25 min |
|---|---|---|---|
| 1 | 0.11 | 0.11 | 0.13 |
| 2 | 0.12 | 0.05 | 0.15 |
| 3 | 0.11 | 0.04 | 0.07 |

TABLE 2

Characterization results of PLA pellets.

| Run | Haze, H | YI-D1925(a) | YI-D1925(b) |
|---|---|---|---|
| 1 | 1.5 ± 0.3 | <5 | <3 |
| 2 | 1.1 ± 0.1 | 5.1 | <3 |
| 3 | 1.1 ± 0.1 | 5.1 | <3 |

(a)As collected pellets obtained after underwater granulation
(b)The same pellets after crystallization The results summarized in Table 1 show that a low residual monomer PLA with a high stability against lactide reformation is obtained according to the present invention. Residual monomer was constantly lower than 0.3% by weight and even lower than 0.2%. The lactide reformation was constantly below 0.3%.

Moreover, the results summarized in Table 2 show that all samples had extremely good visual appearance. While an acceptable value of the yellowness index is YI<30 as, and is preferably less than YI<20, in the examples an even lower Yellowness index was recorded, namely one which was constantly lower than 10 and even lower than 3 upon crystallization of the pellets. Similarly, for the haze, H was below H<10 and constantly below H<3.

The lactide residual monomer content was measured by gas chromatography (GC). A sample was dissolved in a dichloromethane together with 1-octanol as internal standard. The polymer was precipitated from the solution by mixing 1 ml of solution with 10 ml of an antisolvent solution, namely a mixture of acetone/hexane (5/95 vol/vol). The final solution was shaked for 1 to 2 hours to ensure the complete precipitation of the polymer and the supernatant from the so obtained final solution is then filtered and injected into the GC.

The yellowness index was measured using a Chromameter as follows: A petri dish was filled with 15 g of PLA pellets and the yellowness index, YI was measured according to the ASTM D1925 method, with illuminant C and observer 2°.

The lactide reformation was measured as follows: First, the residual lactide monomer content in the sample was measured by gas-chromatography and quantified as weight percentage of lactide in the sample, RM1. Then, the sample pellets were dried for at least 4 hours under inert atmosphere at 70° C., loaded on into an melt flow index instrument and heated into the MFI capillary at the desired temperature for a time equal to the test time. After the test time was passed, the material was withdrawn from the MFI outlet as a thin strand, whose content in lactide was measured again by GC, RM2. The extent of lactide reformation was then measured as ΔRM=RM2−RM1 which measured the amount of lactide reformed during the test.

The transmission haze was measured on Haze-Gard Plus® apparatus (BYK Gardner GmbH, Germany) according to ASTM D 1003 (ISO/DIS 14782). Transmission Haze is defined as:

$$H = 100 * T_{dif}/T_T$$

where $T_{dif}$ is the diffuse transmittance and $T_T$ is the total transmittance. Haze was measured in 10 different positions of the samples to verify the uniformity of the specimen. The specimens were prepared as follows: PLA pellets were dried at 80° C. for 4 hours under nitrogen flow. The pellets were then molded to plates of 3×2×0.5 cm using a press heated at 200° C., which was rapidly cooled with a water-cooled press after melting of the pellets. Specimens free of defects (e.g. bubbles) were then further pressed into 1 mm thick films using the same press system, and then used for the measurement.

Figure 4:
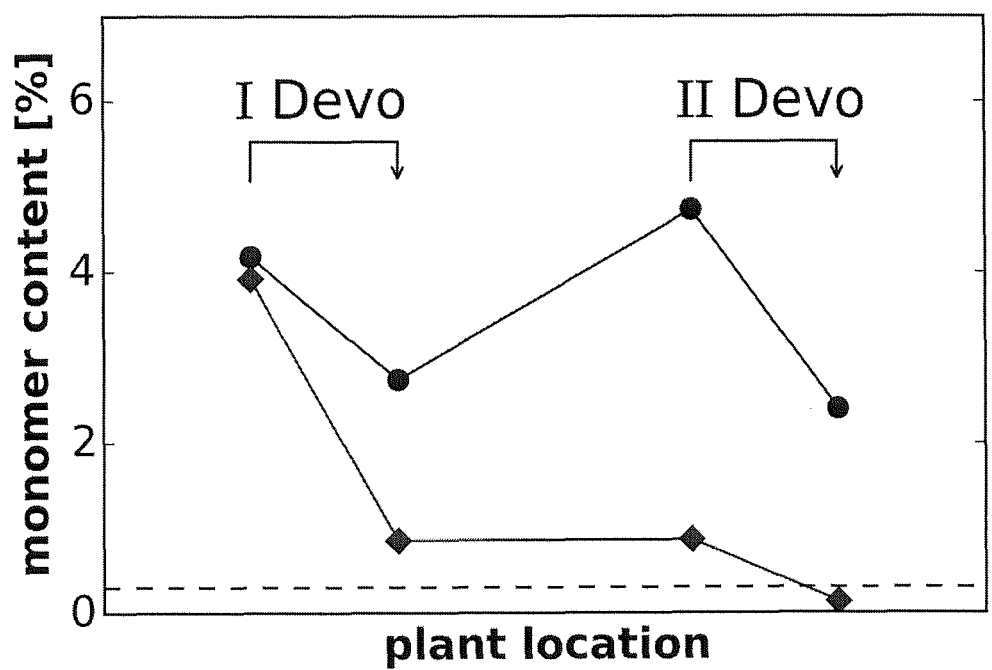
FIG. 4 shows the evolution of monomer content in example 3 through the two-stages devolatilization section in the absence (circles) and in the presence (diamonds) of an alkoxylated alcohol based acid phosphate.

FIG. 4 shows the evolution of monomer content through the two-stages devolatilization section in the absence and in the presence of poly(oxy-1,2-ethanediyl), alpha-hydroxy-omega-hydroxy-mono-C12-15-alkyl ether phosphate (CAS-No: 68071-35-2). The dashed line represents the maximum tolerated value to produce an industrially relevant material. Continuous lines are provided as a guide to the eye. This figure demonstrates the additional benefit of the use of an alkoxylated alcohol based acid phosphate as a polymerization inhibitor in terms of minimizing the undesirable loss of monomer to the overhead devolatilization system. Without wishing to be limited by a specific mechanism, the inventors believe that this shows that such polymerization inhibitors are effective in minimizing undesired back-biting and other chain depolymerization reactions which would liberate monomer resulting in its undesired loss through subsequent devolatilization. Thus in preferred embodiments of the invention, the addition of an alkoxylated alcohol based acid phosphate as polymerization inhibitor will substantially decrease the amount of monomer devolatilized to the overhead system versus the case when no polymerization inhibitor is added. One skilled in the art will understand that this difference may be measured and expressed as a flow rate to the overhead system (e.g. kg/h, measured by accumulating the devolatilized mass over a defined period of time) or as a relative percentage to the feedrate of the feedstream entering the devolatilization system. In some specific preferred embodiments the monomer content going to a first devolatilization unit will be reduced by at least 0.5% and to a second devolatilization unit by at least 1, preferably 2%, all relative to the feedstream. It was also observed (not shown) that the use of the alkoxylated alcohol based acid phosphate polymerization inhibitors, specifically poly(oxy-1,2-ethanediyl), alpha-hydroxy-omega-hydroxy-mono-C12-15-alkyl ether phosphate (CAS-No: 68071-35-2), also significantly reduced the yellowness index of polymer samples taken after either of the two devolatilization units versus comparative examples in which no polymerization inhibitor was added. Therefore in preferred embodiments of the invention, the addition of an alkoxylated alcohol based acid phosphate as polymerization inhibitor will substantially decrease the yellowness index of the polymer mass exiting the devolatilization unit(s) versus the case when no polymerization inhibitor is added. In certain specific preferred embodiments of the invention, it has been found that the use of these polymerization inhibitors reduces the yellowness index of the final polymer pellets by at least 5, preferably 10, as measured in accordance with YI-D1925.

Comparative Example 3-1

The same method as in example 3 was repeated except that a mixture of mono and di-stearic acid phosphates was added to the polymerization stream at position 46 so that the inhibitor concentration was and 0.1% by weight.

Extensive fouling was observed in the wash system. More specifically, fouling was in the form of waxy residues floating on the liquid solution in the countercurrent column 50, which in turn caused difficult operation of the recirculation system 56.

This example clearly demonstrates that not all phosphorous based compounds can be used in a polymerization plant for the production of polylactic acid.

Comparative Example 3-2

The same method as in comparative example 3-1 was repeated except that dibutyl phosphate was added to the polymerization stream at position 46. Two runs were operated, namely a first with an inhibitor concentration of 0.1% by weight and a second with an inhibitor concentration of 0.04% by weight relative to the lactide feed.

In both runs, already after a few hours of inhibitor dosing it could be observed through the glass window present in the devolatilization vessel 14 that layers of material started depositing at the walls of the devolatilizer as well as on the glass window. Due to the high temperature of the devolatilizer, such layer of material turned into black carbonized layers.

A similar phenomenon was observed in an independent run in which dibutyl phosphate was added to the polymerization stream in position 46', which caused the deposition of material on the glass window and at the walls of the devolatilizer 40.

Also this comparative example clearly shows that not all phosphorous based compounds can be used in a polymerization plant for the production of polylactic acid.

EXAMPLE 4 AND COMPARATIVE EXAMPLE 4

Solutions were prepared by mixing 5 ml of lactic acid and 5 ml of water in a vial together with a weighted amount of inhibitor as reported in Table 3.

All vials were cap-sealed immediately after preparing the solutions. The physical state of each additive, in its pure state at room temperature, is reported in the third column of Table 3.

Then the solutions where shaken for ½ hours and left to rest for a few hours. The physical status of the solutions was then observed. All but the solution containing ADK-AX-71 were composed of free flowing liquid, e.g. they were apparently free of any solid residue or insoluble solid-like fraction.

To check if the presence of suspended material in the solution containing ADK-AX-71 was due to a slow solubilization or to an actual insolubility issue, all solutions were additionally heated in an oven at 130° C. for 2 hours to ensure a complete melting of the inhibitors and then allowed to cool down to room temperature.

The presence or absence of unsoluble fractions is reported in Table 3.

TABLE 3

Solubility test of inhibitor

| Inhibitor | Amount [g] | Physical state of the inhibitor at room temperature | Presence of unsoluble fraction in the solution | Presence of unsoluble fraction in the solution (after heating/cooling) |
|---|---|---|---|---|
| ADK STAB AX-71 (mono- and distearyl acid phosphate) | 0.30 | Solid | Yes | Yes |
| Poly(oxy-1,2- ethanediyl), alpha.-hydro-.omega.-hydroxy-, mono-$C_{12-15}$-alkyl ether phosphates | 0.35 | Viscous liquid | No | No |
| Dibuthyl-phosphate (aliphatic phosphate) | 0.43 | Liquid | No | No |
| N,N'-bis(salicylidene)-1,3-propanediamine | 0.30 | Solid | No | No |

EXAMPLE 5

A 20 ml vial was filled with 5 g of lactide and 0.19% by weight of N,N'-bis(salicylidene)-1,3-propanediamine. The vial was put into the oven at 80° C. for 5 hours do dry the lactide. After drying, the vial was sealed and heated to 160° C. to melt the lactide. Then, a 0.1 ml of a 1% (wt/wt) solution of TinOctoate/Ethyl-Hexanol was injected into the vial, which was shaken to homogenize the mixture and allowed to react overnight.

The same procedure was applied to a second vial without adding any inhibitor.

After the reaction, both vials were cooled down and their content analyzed by Gas-Chromatography. The so described procedure was repeated two times with the inhibitor and two times without the inhibitor, to ensure reproducibility. Results below are average of the two repetitions.

An average lactide conversion of 72% was measured for the sampled polymerized in the absence of N,N'-bis(salicylidene)-1,3-propanediamine, while a negligible average conversion of much less than 5% was measured in the presence of N,N'-bis(salicylidene)-1,3-propanediamine.

These results show that N,N'-bis(salicylidene)-1,3-propanediamine is a very effective catalyst inhibitor, which, as shown in the example above, is not expected to cause any fouling problems in a washing system as depicted in FIG. 3.

REFERENCE NUMERALS 10 reactor system
12 unit (mixer(s) and/or heat exchangers)
14 first devolatilization chamber
16 vapor line
18 condenser
20 gas removal line
22 fluid removal line
24 static melt crystallizer
26 recycle line
28 cyclic ester (lactide) supply line
30 supply line for catalyst and initiator
32 supply line
34 liquid (melt) line
36 unit (mixer(s) and/or heat exchangers)
38 line
40 second devolatilization chamber
42 polymer withdrawal line
44 vapor removal line
46, 46', 46" supply line for polymerization inhibitor(s)
48 ejector
50 countercurrent column
52 distributor for aqueous solution
54 vacuum system
56 recirculation system
58 pump
60 removal line
62 line
64 first heat exchanger
66 second heat exchanger
68 reactor
70 third heat exchanger

The invention claimed is:

1. A method for stabilizing a condensed phase composition, which contains i) at least one polymerizable cyclic ester and ii) at least one catalyst capable of catalyzing a polymerization of the cyclic ester and/or at least one initiator capable of initiating a polymerization of the cyclic ester and/or a reaction product or a residue of the at least one catalyst and/or of the at least one initiator, i) wherein the method is used in a process of manufacturing a polyester from cyclic ester monomer and comprises the steps of:
a) providing a cyclic ester,
b) polymerizing the cyclic ester in the presence of the catalyst and/or the initiator in a reactor to form a reaction mixture comprising polyester and unreacted cyclic ester,
c) subjecting the reaction mixture to a devolatilization to obtain a purified polyester as molten residue and a vapor, which includes mainly i) the at least one polymerizable cyclic ester and ii) the at least one catalyst and/or the at least one initiator and/or a reaction product or a residue of the at least one catalyst and/or the at least one initiator, and
d) subjecting the vapor stream to a condensation to obtain the condensed phase composition,
wherein at least one polymerization inhibitor is added as stabilizer to the reaction mixture and/or to the condensed phase composition in an amount so that the degree of conversion of the polymerizable cyclic ester in the condensed phase composition is not more than 15%, wherein the degree of conversion is $100 \cdot (c_0-c_F)/c_0$, wherein $c_0$ is the initial concentration of the cyclic ester in the condensed phase composition obtained by the condensation of the vapor stream and $c_F$ is the concentration of the cyclic ester in the condensed phase composition after addition of 150 ppm of tin octoate as catalyst and of 100 mmol/kg of ethyl-hexanol as initiator to the condensed phase composition and a subsequent heat treatment of the condensed phase under inert atmosphere conditions for 12 hours at 160° C.,
wherein
$i_a$) either at least a part of the polymerization inhibitor is added to the vapor stream drawn off from the devolatilization and/or to the condensed composition, and/or
$i_b$) at least a part of the polymerization inhibitor is added to the reaction mixture before step c), and wherein the devolatilization is performed at a temperature above 203° C. and at a pressure below 4 mbar or, alternatively, at a temperature above 220° C. and at a pressure below 5 mbar, or ii) wherein the method is used in a process of manufacturing lactide from lactic acid and comprises the steps of:
a) providing lactic acid,
b) polycondensation of the lactic acid in a reactor to form a reaction mixture comprising a polylactic acid prepolymer,
c) adding a catalyst to the reaction mixture and depolymerizing the reaction mixture,
d) devolatilizing the reaction mixture to obtain a crude lactide stream,
e) subjecting the vapor stream to a condensation to obtain the condensed phase composition,
wherein at least one polymerization inhibitor is added as stabilizer to the reaction mixture and/or to the condensed phase composition in an amount so that the degree of conversion of the polymerizable cyclic ester in the condensed phase composition is not more than 15%, wherein the degree of conversion is $100 \cdot (c_0-c_F)/c_0$, wherein $c_0$ is the initial concentration of the cyclic ester in the condensed phase composition obtained by the condensation of the vapor stream and $c_F$ is the concentration of the cyclic ester in the condensed phase composition after addition of 150 ppm of tin octoate as catalyst and of 100 mmol/kg of ethyl-hexanol as initiator to the condensed phase composition and a subsequent heat treatment of the condensed phase under inert atmosphere conditions for 12 hours at 160° C.,
wherein at least a part of the polymerization inhibitor is added to the vapor stream drawn off from the devolatilization and/or to the condensed composition.

2. The method in accordance with claim 1, wherein the degree of conversion of the polymerizable cyclic ester in the condensed phase composition is not more than 10%.

3. The method in accordance with claim 1, wherein the at least one cyclic ester is selected from the group consisting of lactide, L-lactide, D-lactide, meso-lactide, ε-caprolactone, glycolide and mixtures of one or more of the aforementioned substances.

4. The method in accordance with claim 1, wherein the reaction mixture and the condensed phase composition each contain as catalyst at least one organometallic compound comprising a metal selected from the group consisting of magnesium, titanium, zinc, aluminum, indium, yttrium, tin, lead, antimony, bismuth and any combination of two or more of the aforementioned metals.

5. The method in accordance with claim 1, wherein the reaction mixture and the condensed phase composition each contain as initiator at least one compound comprising at least one carboxyl group and/or hydroxyl group.

6. The method in accordance with claim 1, wherein the at least one polymerization inhibitor is an imine or a diimine.

7. The method in accordance with claim 1, wherein the condensed phase composition comprising the polymerization inhibitor is subjected to a purification step to obtain a purified condensed phase composition.

8. The method in accordance with claim 7, wherein the purified cyclic ester is recycled into the reactor.

9. The method in accordance with claim 1, wherein the condensed phase composition is mixed in order to homogenously distribute the polymerization inhibitor.

10. A condensed phase composition produced in accordance with the method of claim 1, the condensed phase composition comprising:
  i) at least 95% by weight of cyclic ester,
  ii) at least 0.5 ppm of at least one catalyst capable of catalyzing a polymerization of the cyclic ester and/or at least 0.01 mmol per kg of at least one initiator capable of initiating a polymerization of the cyclic ester and
  iii) 0.001 to 0.5% by weight of polymerization inhibitor.

11. A method for use of a condensed phase composition in accordance with claim 10 for the production of a polyester, comprising polymerizing the condensed phase composition, wherein before the start of the polymerization, polymerization catalyst and/or polymerization initiator are added to the condensed phase composition, so that the total amount of polymerization catalyst is 1 ppm to 1% by weight and/or the total amount of polymerization initiator is 0.1 to 50 mmol/kg based on the total amount of condensed phase composition.

12. A method for use of a condensed phase composition in accordance with claim 10 for the production of a polyester, comprising the steps of: (I) mixing the condensed phase composition with a melt comprising a cyclic ester and/or a polyester; and so that the total amount of polymerization catalyst is 1 ppm to 1% by weight and/or the total amount of polymerization initiator is 0.1 to 50 mmol/kg based on the total amount (II) polymerizing the condensed phase composition.

13. The method of claim 12, wherein the condensed phase composition is further mixed with polymerization catalyst and/or polymerization initiator, so that the total amount of polymerization catalyst is 1 ppm to 1% by weight and/or the total amount of polymerization initiator is 0.1 to 50 mmol/kg based on the total amount of final composition, wherein the so obtained mixture is then further polymerized.

14. The method of claim 1, wherein the cyclic ester is polymerized in step i(b) in the presence of both the catalyst and the initiator.

* * * * *

UNITED STATES PATENT AND TRADEMARK OFFICE
CERTIFICATE OF CORRECTION

PATENT NO. : 10,059,799 B2
APPLICATION NO. : 15/510917
DATED : August 28, 2018
INVENTOR(S) : Costa et al.

It is certified that error appears in the above-identified patent and that said Letters Patent is hereby corrected as shown below:

In the Claims

Column 32, Line(s) 7, Claim 1 should read -- for 12 hours at 160 °C., --

Column 32, Line(s) 15-18, Claim 1 should read -- wherein the devolatilization is performed at a temperature above 203 °C. and at a pressure below 4 mbar or, alternatively, at a temperature above 220 °C. and at a pressure below 5 mbar, or --

Column 32, Line(s) 47, Claim 1 should read -- for 12 hours at 160 °C., --

Signed and Sealed this
Fifteenth Day of January, 2019

Andrei Iancu
*Director of the United States Patent and Trademark Office*